(12) United States Patent
Wang

(10) Patent No.: US 10,764,848 B2
(45) Date of Patent: Sep. 1, 2020

(54) INTER-BASE-STATION SYNCHRONIZATION METHOD AND DEVICE

(71) Applicant: Huawei Technologies Co., Ltd., Shenzhen, Guangdong (CN)

(72) Inventor: Man Wang, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/127,647

(22) Filed: Sep. 11, 2018

(65) Prior Publication Data
US 2019/0028985 A1 Jan. 24, 2019

Related U.S. Application Data

(63) Continuation of application No. PCT/CN2016/076380, filed on Mar. 15, 2016.

(51) Int. Cl.
*H04W 56/00* (2009.01)
*H04B 7/26* (2006.01)

(52) U.S. Cl.
CPC ........ *H04W 56/001* (2013.01); *H04B 7/2687* (2013.01); *H04W 56/0015* (2013.01)

(58) Field of Classification Search
CPC ........... H04W 56/001; H04W 56/0015; H04W 56/0025; H04B 7/2687
See application file for complete search history.

(56) References Cited

U.S. PATENT DOCUMENTS

| | | | |
|---|---|---|---|
| 7,865,212 | B2 | 1/2011 | Tysowski |
| 2001/0022779 | A1 | 9/2001 | Wheatley et al. |

(Continued)

FOREIGN PATENT DOCUMENTS

| | | |
|---|---|---|
| CN | 1288614 A | 3/2001 |
| CN | 101035327 A | 9/2007 |

(Continued)

OTHER PUBLICATIONS

IEEE Std 1588™-2008(Revision of IEEE Std 1588-2002),IEEE Standard for a Precision ClockSynchronization Protocol for Networked Measurement and Control Systems,dated Jul. 24, 2008,total 289 pages.

*Primary Examiner* — Afshawn M Towfighi
(74) *Attorney, Agent, or Firm* — Womble Bond Dickinson (US) LLP

(57) ABSTRACT

An inter-base-station synchronization method and a device are provided. The method includes: sending, by a source base station, a request for time synchronization to a target base station, request for time synchronization; receiving, by the source base station, an acknowledgment message from the target base station; sending, by the source base station, a particular sequence to a target user terminal located in a particular area, so that the target user terminal sends the particular sequence; and detecting, by the source base station, the particular sequence, and performing time synchronization between the source base station and the target base station. According to the present disclosure, the user terminal located in the particular area forwards the particular sequence, so that to-be-synchronized base stations detect the particular sequence to implement inter-base-station time synchronization.

18 Claims, 10 Drawing Sheets

(56) References Cited

U.S. PATENT DOCUMENTS

| | | | |
|---|---|---|---|
| 2008/0130584 A1* | 6/2008 | Pani | H04W 36/0083 |
| | | | 370/332 |
| 2010/0054237 A1 | 3/2010 | Han et al. | |
| 2014/0314069 A1 | 10/2014 | Park et al. | |
| 2015/0092754 A1* | 4/2015 | Gupta | H04W 56/0015 |
| | | | 370/336 |
| 2016/0100374 A1 | 4/2016 | Choi et al. | |
| 2016/0128009 A1* | 5/2016 | Yoon | H04W 4/70 |
| | | | 370/350 |
| 2016/0183208 A1 | 6/2016 | Lee et al. | |

FOREIGN PATENT DOCUMENTS

| | | |
|---|---|---|
| CN | 101154984 A | 4/2008 |
| CN | 102612134 A | 7/2012 |
| CN | 103313381 A | 9/2013 |
| CN | 103797869 A | 5/2014 |
| EP | 2249616 A1 | 11/2010 |
| EP | 3007498 A1 | 4/2016 |
| FR | 2972322 A1 | 9/2012 |
| WO | 2014196748 A1 | 12/2014 |
| WO | 2015016630 A1 | 2/2015 |

* cited by examiner

INTER-BASE-STATION SYNCHRONIZATION METHOD AND DEVICE

CROSS-REFERENCE TO RELATED APPLICATIONS

This application is a continuation of International Application No. PCT/CN2016/076380, filed on Mar. 15, 2016, the disclosure of which is incorporated by reference herein in its entirety.

TECHNICAL FIELD

The present disclosure relates to the field of communications technologies, and in particular, to an inter-base-station synchronization method and a device.

BACKGROUND

In a mobile communications system based on a base station, inter-base-station synchronization is closely related to synchronization quality for a wireless communications service. There are two types of existing inter-base-station synchronization technologies: One is to implement synchronization by using a built-in Global Positioning System (GPS), BeiDou Navigation Satellite System, or IEEE 1588v2, and the other is to implement synchronization based on assistance of a user terminal. Although the former type of synchronization technology can implement high-precision time synchronization, synchronization precision is dependent on accuracy of a counter frequency, and imposes relatively high requirements on performance of a target base station and a network. Therefore, it is difficult in implementation. The latter type of synchronization technology is implemented based on a user terminal that needs to be handed over between base stations. A manner is: When a user terminal initiates a request for a handover from a source base station to a target base station, the source base station and the target base station determine moments at which same random access information sent by the user terminal is received by the source base station and the target base station, so that a time difference between the source base station and the target base station is obtained, and further synchronization between the source base station and the target base station is implemented. However, there is not always a user terminal that meets such a requirement. If a synchronization period is short, there may be no user terminal that needs a handover in this period, and synchronization precision is affected. Another manner is: A user terminal sends data to both a source base station and a target base station, where sending time is added to the sent data, so that the source base station and the target base station obtain a time difference between the base stations based on the sending time and receiving time. However, in this manner, time information needs to be reported by a user, and more messages need to be reported by the user terminal. As a result, a UE-related protocol needs to be modified, and implementation difficulty is increased.

SUMMARY

Embodiments of the present disclosure provide an inter-base-station synchronization method and a device. A user terminal located in a particular area forwards a particular sequence, so that to-be-synchronized base stations detect the particular sequence to implement inter-base-station time synchronization. Because it is simple and convenient to determine a user terminal, an inter-base-station synchronization period can be shortened, thereby increasing synchronization precision.

A first aspect of the embodiments of the present disclosure provides an inter-base-station synchronization method, including: sending, by a source base station, a request for time synchronization to a target base station; receiving an acknowledgment message fed back by the target base station for the request for time synchronization; and after receiving the acknowledgment message, sending a particular sequence to a target user terminal located in a particular area, so that the target user terminal sends the particular sequence. In this way, the source base station can detect the particular sequence to implement time synchronization between the source base station and the target base station. The target user terminal located in the particular area forwards the particular sequence, so that a to-be-synchronized source base station and target base station detect the particular sequence to implement inter-base-station time synchronization. Because it is simple and convenient to determine a target user terminal, an inter-base-station synchronization period can be shortened, thereby increasing synchronization precision.

In one embodiment, before the sending, by the source base station, a particular sequence to a target user terminal located in a particular area, the method further includes: determining, by the source base station based on channel quality information reported by at least one user terminal, a user terminal whose channel quality information carries a channel quality value corresponding to the source base station and a channel quality value corresponding to the target base station, as a target user terminal located in the particular area. Actually, there is a user terminal located in the particular area in most cases, and therefore it is more convenient to determine a target user terminal.

In one embodiment, the source base station determines, based on channel quality information reported by at least one user terminal, a user terminal whose channel quality information carries a channel quality value corresponding to the source base station and a channel quality value corresponding to the target base station, as a target user terminal located in the particular area, where the particular area includes an area covered by both the source base station and the target base station, or the particular area includes an area in which a user terminal sending a signal that can be received by the source base station and the target base station is located. If there are a number of determined user terminals located in the particular area, the source base station determines a user terminal with a channel quality value corresponding to the source base station less than a preset threshold and/or with a highest channel quality value corresponding to the target base station, as a target user terminal located in the particular area; or the source base station determines one user terminal in an idle state or in a no-data-sending state from the user terminals as a target user terminal, where the idle state is used to indicate a state in which a radio resource control (RRC) connection is released, and the no-data-sending state is used to indicate a state in which an RRC connection is established and no data is sent to the source base station.

In one embodiment, the source base station determines, based on geographical location information reported by at least one user terminal, a user terminal whose geographical location information is located in the particular area, as a target user terminal. If there are a number of determined user terminals located in the particular area, the source base station determines one user terminal in an idle state or in a no-data-sending state from the user terminals as a target user terminal.

In one embodiment, the particular sequence is sent by the source base station to the target base station after being added to the request for time synchronization; or the particular sequence is sent by the target base station to the source base station after being added to the acknowledgment message; or the particular sequence is a sequence agreed by the source base station and the target base station before the request for time synchronization is sent; or the particular sequence includes a sequence jointly agreed by a number of base stations in a synchronization area under areas covered by the source base station and the target base station. It may be understood that if there is one agreed sequence, both the source base station and the target base station have known the particular sequence used to indicate time synchronization. In this case, the source base station and the target base station do not need to determine the particular sequence again, and therefore neither of the base stations need to send the particular sequence to the other party.

In one embodiment, the particular sequence includes a random access preamble or a pilot signal, where the random access preamble is sent by the target user terminal through random access, and the pilot signal is sent by the target user terminal at any protocol layer in a network system structure.

In one embodiment, the method further includes: sending, by the source base station to the target user terminal, indication information including target sending time and/or a target resource for sending the particular sequence by the target user terminal, so that the target user terminal sends the particular sequence based on the target sending time and/or the target resource.

In one embodiment, time synchronization is performed by using related information about time at which the source base station and the target base station find the synchronization sequence and that is recorded by the source base station and the target base station.

A feasible solution is: The source base station detects the particular sequence, and records first time at which the particular sequence is found; and sends the first time to the target base station, so that the target base station performs time synchronization based on the first time and second time.

In one embodiment, the source base station may further send a first transmission delay to the target base station, so that the target base station performs time synchronization based on the first time, the second time, the first transmission delay, and a second transmission delay, where the first transmission delay is a transmission delay between the target user terminal and the source base station, and the second transmission delay is a transmission delay between the target user terminal and the target base station. Inter-base-station time synchronization precision can be increased with reference to the transmission delay difference.

Another feasible solution is: The source base station detects the particular sequence, and records first time at which the particular sequence is found; receives second time sent by the target base station; determines a time difference between the first time and the second time; and adjusts time of the source base station based on the time difference, to complete time synchronization between the source base station and the target base station.

In one embodiment, the source base station may further receive a second transmission delay sent by the target base station, where the second transmission delay is a transmission delay between the target user terminal and the target base station; the source base station determines a transmission delay difference between a first transmission delay and the second transmission delay, where the first transmission delay is a transmission delay between the target user terminal and the source base station; and source base station adjusts the time of the source base station based on the time difference and the transmission delay difference, to complete time synchronization between the source base station and the target base station. Inter-base-station time synchronization precision can be increased with reference to the transmission delay difference.

According to the foregoing two solutions, in one embodiment, the source base station determines the first transmission delay between the source base station and the target user terminal based on most recent random access by the target user terminal to the source base station. Alternatively, the source base station sends a random access command to the target user terminal, so that the target user terminal initiates random access according to the random access command; and determines the first transmission delay based on the random access initiated by the target user terminal. In one embodiment, the particular sequence found by the source base station is sent by the target user terminal to the source base station, so that the target base station performs blind detection and records the second time at which the particular sequence is found. In one embodiment, the source base station sends a target base station identity corresponding to the target base station to the target user terminal, so that the target user terminal sends the particular sequence to the target base station, and the target base station records the second time at which the particular sequence is found.

A second aspect of the embodiments of the present disclosure provides another inter-base-station synchronization method, including: receiving, by a target base station, a request for time synchronization sent by a source base station; feeding back an acknowledgment message indicative of performing time synchronization to the source base station, so that after receiving the acknowledgment message, the source base station sends a particular sequence to a target user terminal located in a particular area; and detecting, by the target base station, the particular sequence sent by the target user terminal, and performing time synchronization. The target user terminal located in the particular area forwards the particular sequence, so that a to-be-synchronized source base station and target base station detect the particular sequence to implement inter-base-station time synchronization. Because it is simple and convenient to determine a target user terminal, an inter-base-station synchronization period can be shortened, thereby increasing synchronization precision.

In one embodiment, the particular sequence is sent by the source base station to the target base station after being added to the request for time synchronization; or the particular sequence is sent by the target base station to the source base station after being added to the acknowledgment message; or the particular sequence is a sequence agreed by the source base station and the target base station before the request for time synchronization is received; or the particular sequence includes a sequence jointly agreed by a number of base stations in a synchronization area under areas covered by the source base station and the target base station. It may be understood that if there is one agreed sequence, both the source base station and the target base station have known the particular sequence used to indicate time synchronization. In this case, the source base station and the target base station do not need to determine the particular sequence again, and therefore neither of the base stations need to send the particular sequence to the other party.

In one embodiment, the particular sequence includes a random access preamble or a pilot signal, where the random access preamble is sent by the target user terminal through random access, and the pilot signal is sent by the target user terminal at any protocol layer in a network system structure.

In one embodiment, time synchronization is performed by using related information about time at which the source base station and the target base find the synchronization sequence and that is recorded by both the source base station and the target base station.

A feasible solution is: The target base station detects the particular sequence, and records second time at which the particular sequence is found; receives first time sent by the source base station; determines a time difference between the first time and the second time; and adjusts time of the target base station based on the time difference, to complete time synchronization between the source base station and the target base station.

In one embodiment, the target base station may further receive a first transmission delay sent by the source base station, where the first transmission delay is a transmission delay between the target user terminal and the source base station; and the target base station determines a transmission delay difference between the first transmission delay and a second transmission delay, where the second transmission delay is a transmission delay between the target user terminal and the target base station; and adjusting, by the target base station, time of the target base station based on the time difference may include: adjusting the time of the target base station based on the time difference and the transmission delay difference, to complete time synchronization between the source base station and the target base station. Inter-base-station time synchronization precision can be increased with reference to the transmission delay difference.

Another feasible solution is: The target base station detects the particular sequence, and records second time at which the particular sequence is found; and sends the second time to the source base station, so that the source base station performs time synchronization based on the first time and the second time.

In one embodiment, the target base station may further send a first transmission delay to the source base station, so that the source base station performs time synchronization based on the first time, the second time, the first transmission delay, and a second transmission delay, where the first transmission delay is a transmission delay between the target user terminal and the source base station, and the second transmission delay is a transmission delay between the target user terminal and the target base station. Inter-base-station time synchronization precision can be increased with reference to the transmission delay difference.

According to the foregoing two solutions, in one embodiment, the target base station determines the second transmission delay between the target base station and the target user terminal based on the particular sequence sent by the target user terminal to the target base station. In one embodiment, the particular sequence found by the target base station is sent by the target user terminal to the source base station, so that the target base station performs blind detection and records the second time at which the particular sequence is found. In one embodiment, the particular sequence found by the target base station is sent by the target user terminal to the target base station, so that the source base station performs blind detection and records the first time at which the particular sequence is found.

A third aspect of the embodiments of the present disclosure provides a source base station. The source base station has functions of implementing actions of the source base station in the foregoing method design. The functions may be implemented by using hardware, or may be implemented by hardware executing corresponding software. The hardware or the software includes one or more modules corresponding to the foregoing functions.

In one embodiment, a structure of the source base station includes a processor and a memory. The memory is configured to store application program code that supports the source base station in performing the foregoing method, and the processor is configured to execute the application program stored in the memory. The source base station may further include a communications interface, configured to enable the source base station to communicate with another device or a communications network.

A fourth aspect of the embodiments of the present disclosure provides a target base station. The target base station has functions of implementing actions of the target base station in the foregoing method design. The functions may be implemented by using hardware, or may be implemented by hardware executing corresponding software. The hardware or the software includes one or more modules corresponding to the foregoing functions.

In one embodiment, a structure of the target base station includes a processor and a memory. The memory is configured to store application program code that supports the target base station in performing the foregoing method, and the processor is configured to execute the application program stored in the memory. The target base station may further include a communications interface, configured to enable the target base station to communicate with another device or a communications network.

A fifth aspect of the embodiments of the present disclosure provides a computer storage medium, configured to store a computer software instruction used by the foregoing source base station, where the computer software instruction includes a program that is designed for the source base station to perform the foregoing aspects.

A sixth aspect of the embodiments of the present disclosure provides a computer storage medium, configured to store a computer software instruction used by the foregoing target base station, where the computer software instruction includes a program that is designed for the target base station to perform the foregoing aspects.

In the present disclosure, names of a source base station, a target base station, and a target user terminal impose no limitation on the devices. In actual application, these devices may have other names and fall within the scope defined by the following claims and equivalent technologies of the present disclosure, provided that functions of the devices are similar to those in the present disclosure.

Compared with the prior art, in the solutions provided in the present disclosure, after the source base station and the target base station determine to perform time synchronization, the target user terminal sends the particular sequence, so that both the source base station and the target base station can record the related time information, to implement inter-base-station time synchronization. Because it is simple and convenient to determine a target user terminal, an inter-base-station synchronization period can be shortened, thereby increasing synchronization precision.

These or other aspects of the present disclosure are more concise and comprehensible in descriptions of the following embodiments.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

A network architecture and a service scenario described in the embodiments of the present disclosure are intended to describe the technical solutions in the embodiments of the present disclosure more clearly, and do not constitute any limitation on the technical solutions provided in the embodiments of the present disclosure. A person of ordinary skill in the art may understand that with evolution of network architectures and emergence of a new service scenario, the technical solutions provided in the embodiments of the present disclosure are also applicable to a similar technical problem. It should be noted that the terms used in the embodiments of the present disclosure are merely for the purpose of describing specific embodiments, and are not intended to limit the present disclosure. The terms "a", "said" and "the" of singular forms used in the embodiments and the appended claims of the present disclosure are also intended to include plural forms, unless otherwise specified in the context clearly. It should also be understood that, the term "and/or" used in this specification indicates and includes any or all possible combinations of one or more associated listed items. In addition, in this specification, claims, and accompanying drawings of the present disclosure, the terms "first", "second", "third", "fourth", and so on are intended to distinguish between different objects but do not indicate a particular order. Moreover, the terms "including", "comprising", or any other variant thereof, are intended to cover a non-exclusive inclusion. For example, a process, a method, a system, a product, or a device that includes a series of steps or units is not limited to the listed steps or units, but may further include an unlisted step or unit, or may further include another inherent step or unit of the process, the method, the product, or the device.

Figure 1:
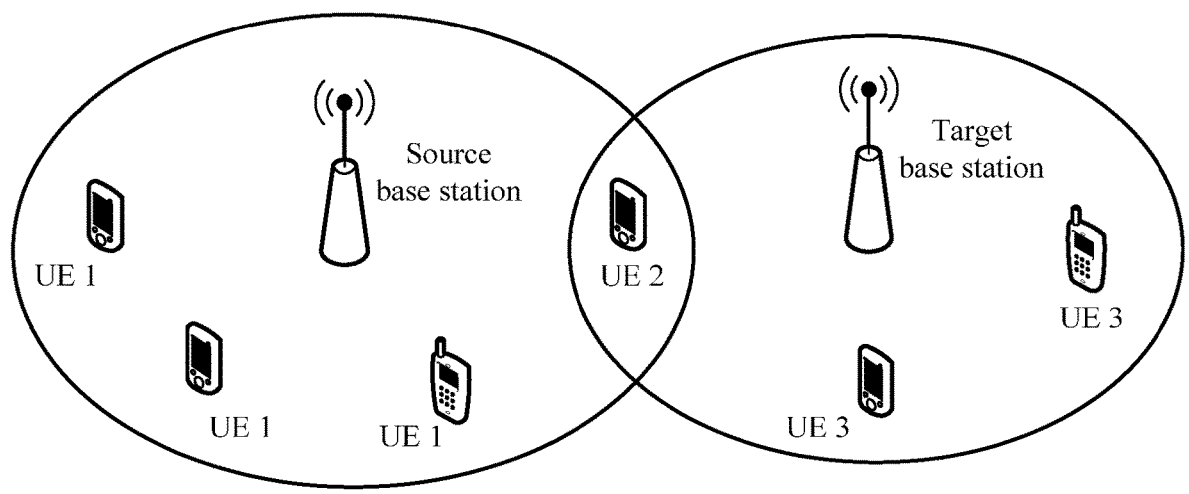
FIG. 1 is an exemplary network architecture diagram according to an embodiment of the present disclosure.

For better understanding of an inter-base-station synchronization method disclosed in the embodiments of the present disclosure, the following first describes a network architecture to which the embodiments of the present disclosure are applicable. Referring to FIG. 1, FIG. 1 is an exemplary network architecture diagram disclosed in an embodiment of the present disclosure. The network architecture shown in FIG. 1 may include a source base station, a number of user terminals or user equipment (UE) located in a coverage area of the source base station such as UE 1 and UE 2 shown in FIG. 1, a target base station, and a number of UEs located in a coverage area of the target base station such as UE 3 and UE 2 shown in FIG. 1. It can be learnt that the UE 2 is located in an area covered by both the source base station and the target base station, and can establish connections with both the source base station and the target base station for communication. The technical solutions in the embodiments of the present disclosure may be applied to various communications systems, for example, a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, and an LTE time division duplex (TDD) system.

In the embodiments of the present disclosure, UE may include but is not limited to a terminal or a mobile terminal. The UE may communicate with one or more core networks by using a radio access network. For example, the UE may be a mobile phone, a tablet computer, a personal digital assistant (PDA), a mobile Internet device (MID), a smart wearable device (such as a smartwatch or a smart band), or other types of terminal devices. These devices exchange data with the radio access network.

In the embodiments of the present disclosure, the source base station and the target base station each may be a base transceiver station (BTS) in GSM or CDMA, a NodeB (NB) in WCDMA, an evolved NodeB (E-NodeB) in 4G (the fourth generation of mobile communications system), a gNB in the 5G (the fifth generation of mobile communications system) system, a remote node, a high-frequency small cell, or other types of base stations. This is not limited in the embodiments of the present disclosure.

Figure 2:
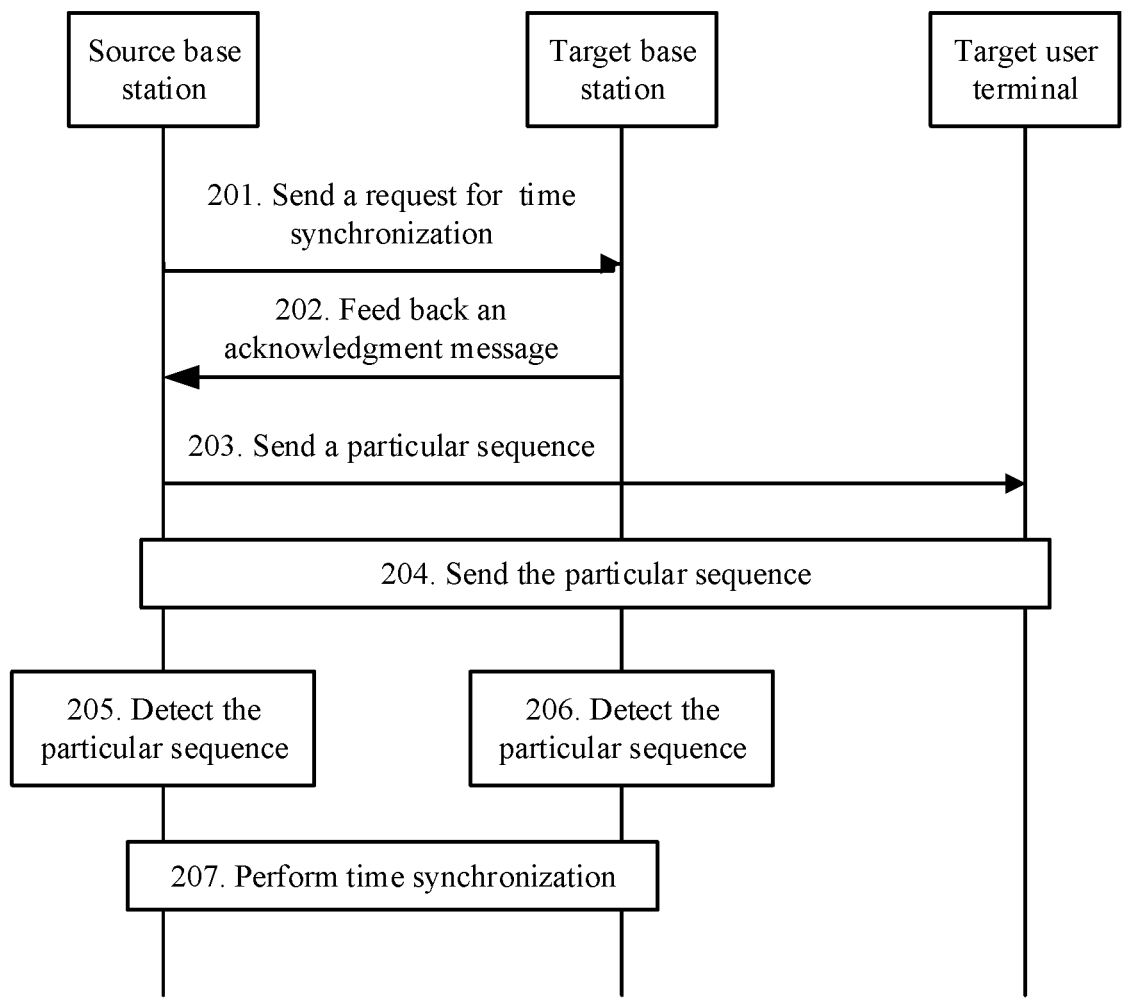
FIG. 2 is a schematic flowchart of an inter-base-station synchronization method according to an embodiment of the present disclosure.

Referring to FIG. 2, FIG. 2 is a schematic flowchart of an inter-base-station synchronization method according to an embodiment of the present disclosure. As shown in FIG. 2, the method according to this embodiment of the present disclosure may include step 201 to step 207.

201. A source base station sends a request for time synchronization to a target base station.

In one embodiment, the source base station sends the request for time synchronization to the target base station. It may be understood that the request for time synchronization is used to instruct the target base station to perform time synchronization.

Correspondingly, the target base station receives the request for time synchronization sent by the source base station.

202. The target base station feeds back an acknowledgment message.

In one embodiment, the target base station feeds back the acknowledgment message that is used to indicate that the target base station determines to perform time synchronization with the source base station, so that the source base station continues to perform time synchronization.

Correspondingly, the source base station receives the acknowledgment message of the target base station.

203. The source base station sends a particular sequence to a target user terminal located in a particular area.

In one embodiment, the source base station sends the particular sequence to the target user terminal located in the particular area. The source base station is corresponding to a coverage area, and the target base station is corresponding to a coverage area. It may be understood that the user terminal in the coverage area can establish a connection to a corresponding base station for communication. The particular area includes an area covered by both the source base station and the target base station, or the particular area includes an area in which a user terminal sending a signal that can be received by the source base station and the target base station is located.

In one embodiment, the particular sequence may be a pilot signal or a random access preamble. This is not limited in this embodiment of the present disclosure.

In one embodiment, before sending the particular sequence to the target user terminal, the source base station determines a user terminal located in the particular area as a target user terminal. A manner of determining a target user terminal is not limited in this embodiment of the present disclosure. The following describes two feasible solutions.

In one solution, the source base station determines, based on channel quality information reported by at least one user terminal, a user terminal whose channel quality information carries a channel quality value corresponding to the source base station and a channel quality value corresponding to the target base station, as a target user terminal located in the particular area. Because a channel quality value is reported by a user terminal, and a channel quality value of any base station is used to indicate signal strength, measured by the user terminal, of the base station, if channel quality information reported by the user terminal includes channel quality values of the source base station and the target base station, it indicates that the user terminal is located in the particular area. If there is one determined user terminal located in the particular area, the source base station determines the user terminal as a target user terminal. If there are a number of determined user terminals located in the particular area, the source base station may determine, from the user terminals, one user terminal from the user terminals as a target user terminal. For example, a first manner is: The source base station determines a user terminal with a highest channel quality value corresponding to the target base station, as a target user terminal. A second manner is: The source base station determines a user terminal with a channel quality value corresponding to the source base station less than a preset threshold, as a target user terminal. A third manner is: The source base station determines one user terminal in an idle state or in a no-data-sending state from the user terminals, as a target user terminal, where the idle state is used to indicate a state in which an RRC connection is released, and the no-data-sending state is used to indicate a state in which an RRC connection is established and no data is sent to the source base station. In one embodiment, for the foregoing three solutions for determining a target user terminal from a number of user terminals located in the particular area, if a target user terminal cannot be determined in one manner, any manner can be used in combination with one or two of the other two manners, to determine a target user terminal.

In another solution, the source base station determines, based on geographical location information reported by at least one user terminal, a user terminal whose geographical location information is located in the particular area, as a target user terminal. If there are a number of determined user terminals located in the particular area, the source base station determines one user terminal in an idle state or in a no-data-sending state from the user terminals as a target user terminal. The idle state and the no-data-sending state are described in the foregoing solution.

Correspondingly, the target user terminal receives the particular sequence.

204. The target user terminal sends the particular sequence.

In one embodiment, the target user terminal sends the particular sequence. In one embodiment, the target user terminal may send the particular sequence to the source base station. The source base station may directly receive the particular sequence sent by the target user terminal, and the target base station performs blind detection. In another embodiment, the target user terminal may send the particular sequence to the target base station. The target base station may directly receive the particular sequence sent by the target user terminal, and the source base station performs blind detection. In one embodiment, the target user terminal may send the particular sequence to the target base station based on a target identifier corresponding to the target base station sent by the source base station. When the particular sequence is a random access preamble, the target user terminal sends the random access preamble by initiating random access. When the particular sequence is a pilot signal, the target user terminal sends the pilot signal at any protocol layer in a network system structure. The pilot signal may be a sounding reference signal (SRS), a demodulation reference signal (DMRS), or other types of signals. This is not limited in this embodiment of the present disclosure. The network system structure may include but is not limited to an open system interconnection (OSI) 7-layer model and a TCP/IP 5-layer model. In one embodiment, the pilot signal may be sent on a control channel such as a physical downlink control channel (PDCCH) or an enhanced physical downlink control channel (EPDCCH), or may be sent by using a Media Access Control (MAC) layer message, or radio link control (RLC) layer or radio resource control (RRC) signaling.

It should be noted that the source base station and the target base station need to learn of the to-be-detected or to-be-received particular sequence in advance, no matter whether the source base station and the target base station directly receive the particular sequence or perform blind detection on the particular sequence. This helps the source base station and the target base station record time at which the particular sequence is found, to perform time synchronization. In one embodiment, the particular sequence is sent by the source base station to the target base station after being added to the request for time synchronization, for example, the particular sequence is temporarily determined or selected from a number of candidate particular sequences by the source base station. Alternatively, the particular sequence is sent by the target base station to the source base station after being added to the acknowledgment message, for example, the particular sequence is temporarily determined or selected from a number of candidate particular sequences by the target base station. Alternatively, the particular sequence is a sequence agreed by the source base station and the target base station before the request for time synchronization is sent. Alternatively, the particular sequence includes a sequence jointly agreed by a number of base stations in a synchronization area under areas covered by the source base station and the target base station. It may be understood that if there is one agreed sequence, both the source base station and the target base station have known the particular sequence used to indicate time synchronization. In this case, the source base station and the target base station do not need to determine the particular sequence again, and therefore neither of the base stations need to send the particular sequence to the other party.

205. The source base station detects the particular sequence.

In one embodiment, the source base station detects the particular sequence. In one embodiment, the source base station performs step 205 after sending the particular sequence to the target user terminal.

206. The target base station detects the particular sequence.

In one embodiment, the target base station detects the particular sequence. In one embodiment, the target base station performs step 206 after feeding back the acknowledgment message to the source base station.

It should be noted that the particular sequence detected in step 205 and step 206 is sent by the target user terminal. Further, the target user terminal simultaneously sends the particular sequence to the target base station and the source base station for detection. In one embodiment, when sending the particular sequence, the target user terminal may add a times identifier, for example, a first time or a second time. The first time indicates that the target user terminal sends the particular sequence for the first time after receiving the particular sequence sent by the source base station this time. Meanings of other times can be deduced by analogy. In this way, accuracy of detecting the particular sequence by the target base station and the source base station can be increased.

207. The source base station and the target base station perform time synchronization.

In one embodiment, the source base station and the target base station perform time synchronization. In a feasible solution, time of the source base station may be used as a reference for the target base station to perform time synchronization. For example, the source base station sends, to the target base station, time at which the particular sequence is found, and the target base station completes time synchronization based on the time sent by the source base station and time at which the target base station finds the particular sequence. Alternatively, time of the target base station may be used as a reference for the source base station to perform time synchronization. For example, the target base station sends, to the source base station, time at which the particular sequence is found, and the source base station completes time synchronization based on the time sent by the target base station and time at which the source base station finds the particular sequence.

It should be noted that in this embodiment of the present disclosure, the source base station may send the request for time synchronization to the target base station when having a service requirement related to the target base station, so that time synchronization is performed based on the service requirement, thereby reducing an occupied system resource. In addition, regardless of the solutions, actually, there is a user terminal located in the particular area in most cases, and the particular sequence is information frequently sent by the user terminal. Therefore, according to this embodiment of the present disclosure, inter-base-station time synchronization can be implemented conveniently.

Further, the solutions in this embodiment of the present disclosure are also applicable to time synchronization among at least three base stations. For example, in one embodiment, time of any base station or a pre-agreed base station may be used as a reference, and the other base stations are non-reference base station. Time recorded by the reference base station may be sent to the non-reference base stations, and the non-reference base stations perform time synchronization based on time recorded by the non-reference base stations and the time sent by the reference base station.

In this embodiment of the present disclosure, after determining, with the target base station, to perform time synchronization, the source base station sends the particular sequence to the user terminal located in the particular area, and the user terminal forwards the sequence, so that the to-be-synchronized base stations detect the particular sequence, to implement inter-base-station time synchronization. This reduces implementation difficulty and shortens an inter-base-station synchronization period, thereby increasing synchronization precision.

Figure 3:
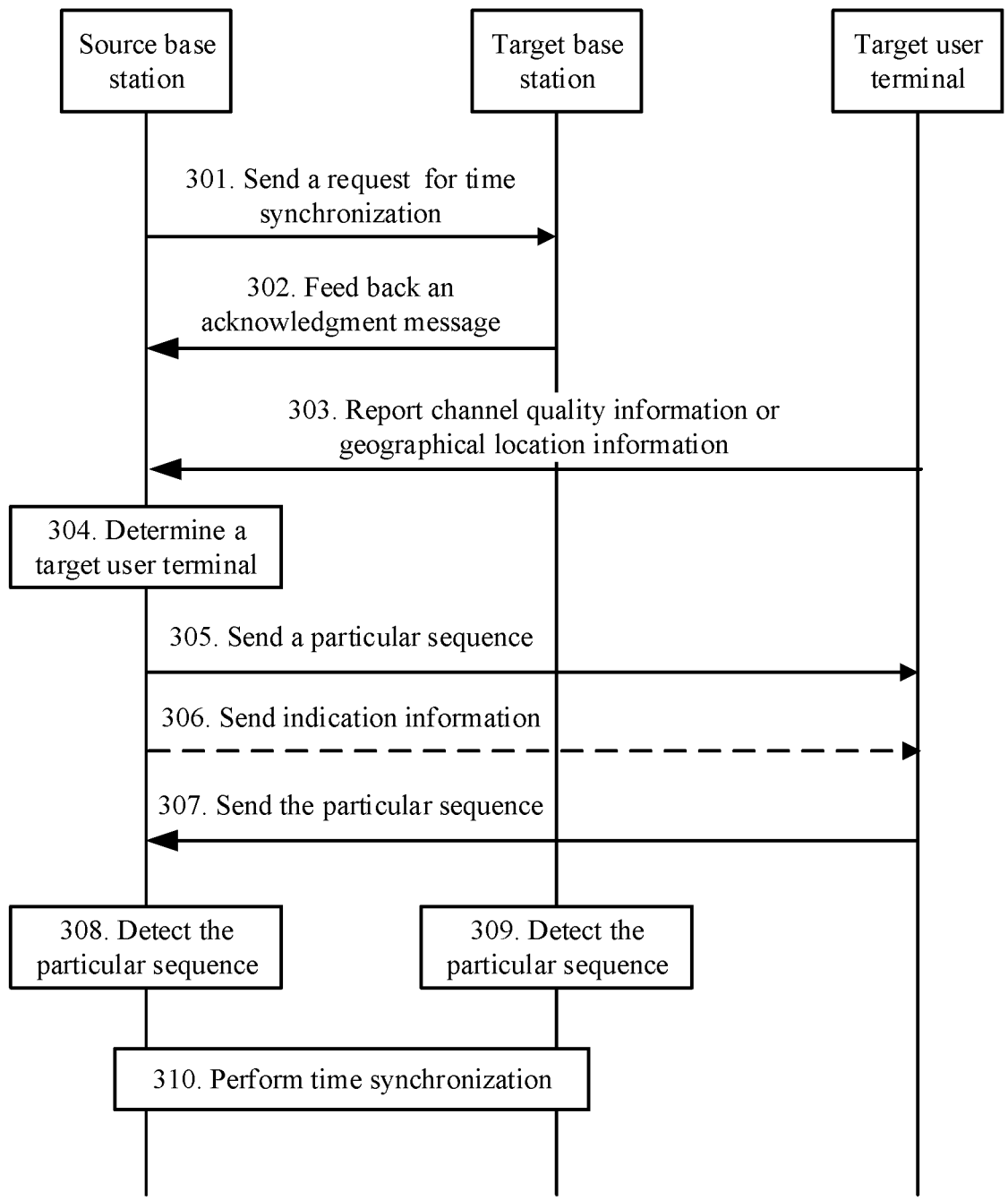
FIG. 3 is a schematic flowchart of another inter-base-station synchronization method according to an embodiment of the present disclosure.

Referring to FIG. 3, FIG. 3 is a schematic flowchart of another inter-base-station synchronization method according to an embodiment of the present disclosure. As shown in FIG. 3, the method according to this embodiment of the present disclosure may include step 301 to step 310.

301. A source base station sends a request for time synchronization to a target base station.

In one embodiment, the source base station sends the request for time synchronization to the target base station. It may be understood that the request for time synchronization is used to instruct the target base station to perform time synchronization.

Correspondingly, the target base station receives the request for time synchronization sent by the source base station.

302. The target base station feeds back an acknowledgment message.

In one embodiment, the target base station feeds back the acknowledgment message, where the acknowledgment message is used to indicate that the target base station determines to perform time synchronization with the source base station, so that the source base station continues to perform time synchronization.

Correspondingly, the source base station receives the acknowledgment message of the target base station.

303. A target user terminal reports channel quality information or geographical location information to the source base station.

In one embodiment, the target user terminal reports the channel quality information or the geographical location information to the source base station. In one embodiment, for a manner of reporting the information by the target user terminal to the source base station, reference may be made to a prior-art reporting manner. For example, the target user terminal reports the information according to a specific time period, or may report the information after receiving a command of the source base station. This is not limited in this embodiment of the present disclosure.

It should be noted that step 303 may be performed before step 301 and step 302, and there is no limitation on a sequential order.

304. The source base station determines the target user terminal located in a particular area.

In one embodiment, the source base station determines the target user terminal located in the particular area. The source base station is corresponding to a coverage area, and the target base station is corresponding to a coverage area. It may be understood that the user terminal in the coverage area can establish a connection to a corresponding base station for communication. The particular area includes an area covered by both the source base station and the target base station, or the particular area includes an area in which a user terminal sending a signal that can be received by the source base station and the target base station is located. The source base station determines a user terminal located in the particular area as a target user terminal. A manner of determining a target user terminal is not limited in this embodiment of the present disclosure. The following describes two feasible solutions.

In one solution, the source base station determines, based on channel quality information reported by at least one user terminal, a user terminal whose channel quality information carries a channel quality value corresponding to the source base station and a channel quality value corresponding to the target base station, as a target user terminal located in the particular area. Because a channel quality value is reported by a user terminal, and a channel quality value of any base station is used to indicate signal strength, measured by the user terminal, of the base station, if channel quality information reported by the user terminal includes channel quality values of the source base station and the target base station, it indicates that the user terminal is located in the particular area. If there is one determined user terminal located in the particular area, the source base station determines the user terminal as a target user terminal. If there are a number of determined user terminals located in the particular area, the source base station may determine, from the user terminals, one user terminal from the user terminals as a target user terminal. For example, a first manner is: The source base station determines a user terminal with a highest channel quality value corresponding to the target base station, as a target user terminal. A second manner is: The source base station determines a user terminal with a channel quality value corresponding to the source base station less than a preset threshold, as a target user terminal. A third manner is: The source base station determines one user terminal in an idle state or in a no-data-sending state from the user terminals, as a target user terminal, where the idle state is used to indicate a state in which an RRC connection is released, and the no-data-sending state is used to indicate a state in which an RRC connection is established and no data is sent to the source base station. In one embodiment, for the foregoing three solutions for determining a target user terminal from a number of user terminals located in the particular area, if a target user terminal cannot be determined in one manner, any manner can be used in combination with one or two of the other two manners, to determine a target user terminal.

In another solution, the source base station determines, based on geographical location information reported by at least one user terminal, a user terminal whose geographical location information is located in the particular area, as a target user terminal. If there are a number of determined user terminals located in the particular area, the source base station determines one user terminal in an idle state or in a no-data-sending state from the user terminals as a target user terminal. The idle state and the no-data-sending state are described in the foregoing solution.

It should be noted that step 304 may be performed before step 301 and step 302, and there is no limitation on a sequential order.

305. The source base station sends a particular sequence to the target user terminal located in the particular area.

In one embodiment, the source base station sends the particular sequence to the target user terminal located in the particular area. In one embodiment, the particular sequence may be a pilot signal or a random access preamble. This is not limited in this embodiment of the present disclosure.

Correspondingly, the target user terminal receives the particular sequence.

306. The source base station sends indication information to the target user terminal.

In one embodiment, the indication information is used to indicate target sending time and/or a target resource for sending the particular sequence by the target user terminal, so that the target user terminal sends the particular sequence according to the indication information.

It should be noted that step 306 may be performed before step 305, or the indication information and the particular sequence are sent to the target user terminal at the same time, which is not limited in this embodiment of the present disclosure. A sequential order of performing the steps is also not limited.

Correspondingly, the target user terminal receives the indication information.

307. The target user terminal sends the particular sequence to the source base station.

In one embodiment, the target user terminal may send the particular sequence to the source base station based on the indication information. Correspondingly, the source base station may directly receive the particular sequence sent by the target user terminal, and the target base station performs blind detection. When the particular sequence is a random access preamble, the target user terminal sends the random access preamble by initiating random access. When the particular sequence is a pilot signal, the target user terminal sends the pilot signal at any protocol layer in a network system structure. The pilot signal may be an SRS, a DMRS, or other types of signals. This is not limited in this embodiment of the present disclosure. The network system structure may include but is not limited to an OSI 7-layer model and a TCP/IP 5-layer model. During specific implementation, the pilot signal may be sent on a control channel such as a PDCCH or an EPHCCH, or may be sent by using a MAC layer message, or RLC layer or RRC signaling.

It should be noted that the source base station and the target base station need to learn of the to-be-detected or to-be-received particular sequence in advance, no matter whether the source base station directly receives the particular sequence or the target base station performs blind detection on the particular sequence. This helps the source base station and the target base station record time at which the particular sequence is found, to perform time synchronization. In one embodiment, the particular sequence is sent by the source base station to the target base station after being added to the request for time synchronization, for example, the particular sequence is temporarily determined or selected from a number of candidate particular sequences by the source base station. Alternatively, the particular sequence is sent by the target base station to the source base station after being added to the acknowledgment message, for example, the particular sequence is temporarily determined or selected from a number of candidate particular sequences by the target base station. Alternatively, the particular sequence is a sequence agreed by the source base station and the target base station before the request for time synchronization is sent. Alternatively, the particular sequence includes a sequence jointly agreed by a number of base stations in a synchronization area under areas covered by the source base station and the target base station. It may be understood that if there is one agreed sequence, both the source base station and the target base station have known the particular sequence used to indicate time synchronization. In this case, the source base station and the target base station do not need to determine the particular sequence again, and therefore neither of the base stations need to send the particular sequence to the other party.

308. The source base station detects the particular sequence.

In one embodiment, the source base station detects the particular sequence. In one embodiment, the source base station performs step 308 after sending the particular sequence to the target user terminal.

309. The target base station detects the particular sequence.

In one embodiment, the target base station detects the particular sequence. In one embodiment, the target base station performs step 309 after feeding back the acknowledgment message to the source base station.

It should be noted that the particular sequence detected in step 308 and step 309 is sent by the target user terminal. Further, the target user terminal simultaneously sends the particular sequence to the target base station and the source base station for detection. In one embodiment, when sending the particular sequence, the target user terminal may add a times identifier, for example, a first time or a second time. The first time indicates that the target user terminal sends the particular sequence for the first time after receiving the particular sequence sent by the source base station this time. Meanings of other times can be deduced by analogy. In this way, accuracy of detecting the particular sequence by the target base station and the source base station can be increased.

310. The source base station and the target base station perform time synchronization.

Figure 4A:
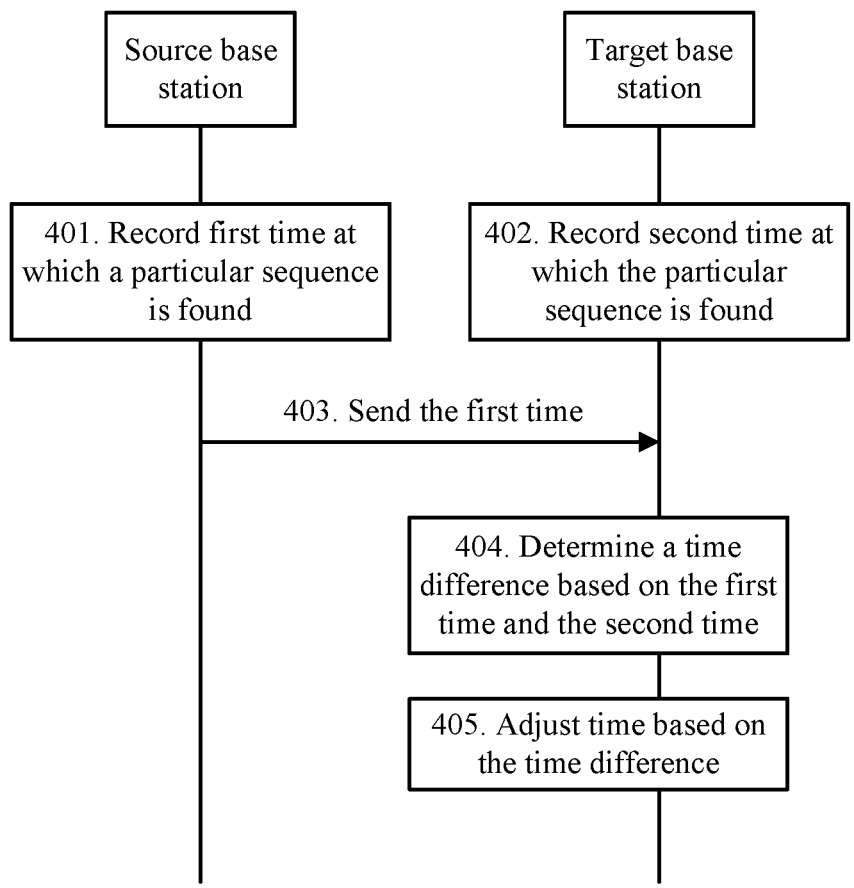
FIG. 4A is a schematic flowchart of another inter-base-station synchronization method according to an embodiment of the present disclosure.
Figure 4B:
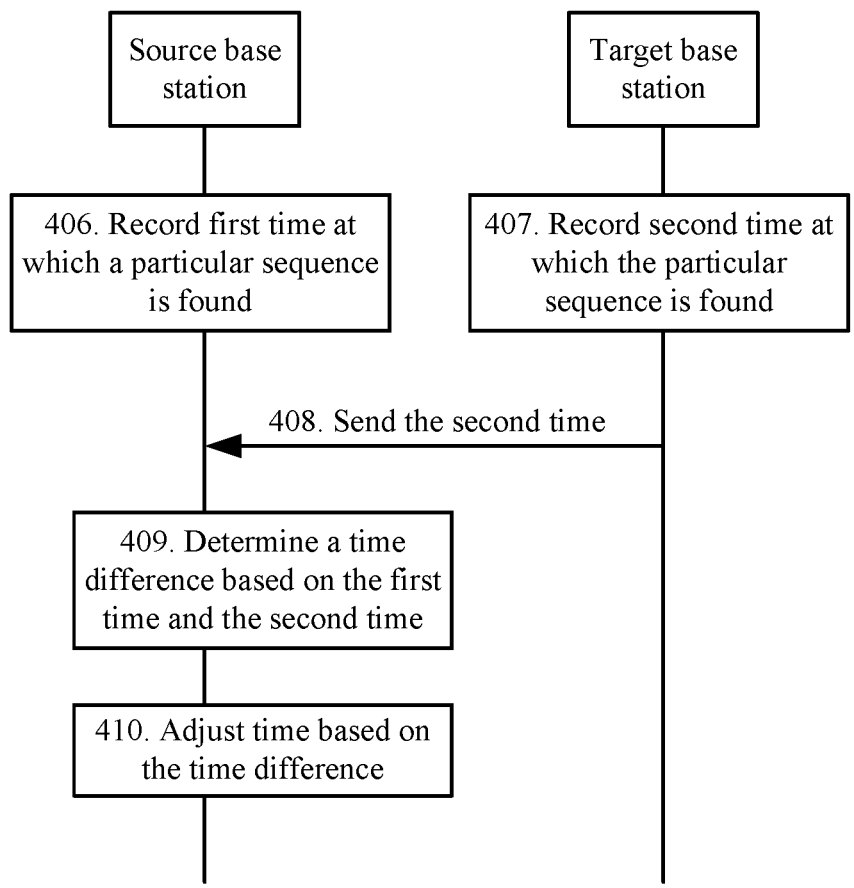
FIG. 4B is a schematic flowchart of another inter-base-station synchronization method according to an embodiment of the present disclosure.

In one embodiment, the source base station and the target base station perform time synchronization. For a specific implementation, reference may be made to FIG. 4A and FIG. 4B. FIG. 4A and FIG. 4B are schematic flowcharts for time synchronization performed by the source base station and the target base station.

As shown in FIG. 4A, the schematic flowchart for time synchronization includes step 401 to step 405.

401. The source base station records first time at which the particular sequence is found.

In one embodiment, the source base station records time at which the particular sequence sent by the target user terminal is received, as the first time at which the particular sequence is found.

402. The target base station records second time at which the particular sequence is found.

In one embodiment, the target base station performs blind detection, and records time at which the particular sequence sent by the target user terminal is found, as the second time at which the particular sequence is found.

403. The source base station sends the first time to the target base station.

In one embodiment, the source base station sends the first time to the target base station.

Correspondingly, the target base station receives the first time.

404. The target base station determines a time difference based on the first time and the second time.

In one embodiment, the target base station determines the time difference based on the first time and the second time. For example, if the first time is T1, and the second time is T2, the time difference is T2−T1.

405. The target base station adjusts time of the target base station based on the time difference.

In one embodiment, the target base station adjusts the time of the target base station based on the time difference. In the foregoing example, the target base station may determine to adjust the time forward or backward based on the time difference T2−T1. If T2−T1 is less than 0, the target base station adjusts the time forward |T2−T1|; if T2−T1 is greater than 0, the target base station adjusts the time backward |T2−T1|; or if T2−T1 is equal to 0, it indicates that the target base station is time-synchronized with the source base station, and no adjustment is required.

As shown in FIG. 4B, the schematic flowchart for time synchronization includes step 406 to step 410.

406. The source base station records first time at which the particular sequence is found.

In one embodiment, the source base station records time at which the particular sequence sent by the target user terminal is received, as the first time at which the particular sequence is found.

407. The target base station records second time at which the particular sequence is found.

In one embodiment, the target base station performs blind detection, and records time at which the particular sequence sent by the target user terminal is found, as the second time at which the particular sequence is found.

408. The target base station sends the second time to the source base station.

In one embodiment, the target base station sends the first time to the target base station.

Correspondingly, the target base station receives the first time.

409. The source base station determines a time difference based on the first time and the second time.

In one embodiment, the source base station determines the time difference based on the first time and the second time. For example, if the first time is T1, and the second time is T2, the time difference is T2−T1.

410. The source base station adjusts time of the source base station based on the time difference.

In one embodiment, the source base station adjusts the time of the source base station based on the time difference. In the foregoing example, the source base station may determine to adjust the time forward or backward based on the time difference T1−T2. If T1−T2 is less than 0, the source base station adjusts the time forward |T1−T2|; if T1−T2 is greater than 0, the source base station adjusts the time backward |T1−T2|; or if T1−T2 is equal to 0, it indicates that the source base station is time-synchronized with the target base station, and no adjustment is required.

It should be noted that in this embodiment of the present disclosure, the source base station may send the request for time synchronization to the target base station when having a service requirement related to the target base station, so that time synchronization is performed based on the service requirement, thereby reducing an occupied system resource. In addition, regardless of the solutions, actually, there is a user terminal located in the particular area in most cases, and the particular sequence is information frequently sent by the user terminal. Therefore, according to this embodiment of the present disclosure, inter-base-station time synchronization can be implemented conveniently.

Further, the solutions in this embodiment of the present disclosure are also applicable to time synchronization among at least three base stations. For example, in one embodiment, time of any base station or a pre-agreed base station may be used as a reference, and the other base stations are non-reference base station. Time recorded by the reference base station may be sent to the non-reference base stations, and the non-reference base stations perform time synchronization based on time recorded by the non-reference base stations and the time sent by the reference base station.

In this embodiment of the present disclosure, after the source base station and the target base station determine to perform time synchronization, the target user terminal located in the particular area forwards the particular sequence to the source base station, so that both the source base station and the target base station detect the particular sequence and record the related time information, to implement inter-base-station time synchronization. Because it is simple and convenient to determine a target user terminal, an inter-base-station synchronization period can be shortened, thereby increasing synchronization precision.

Figure 5:
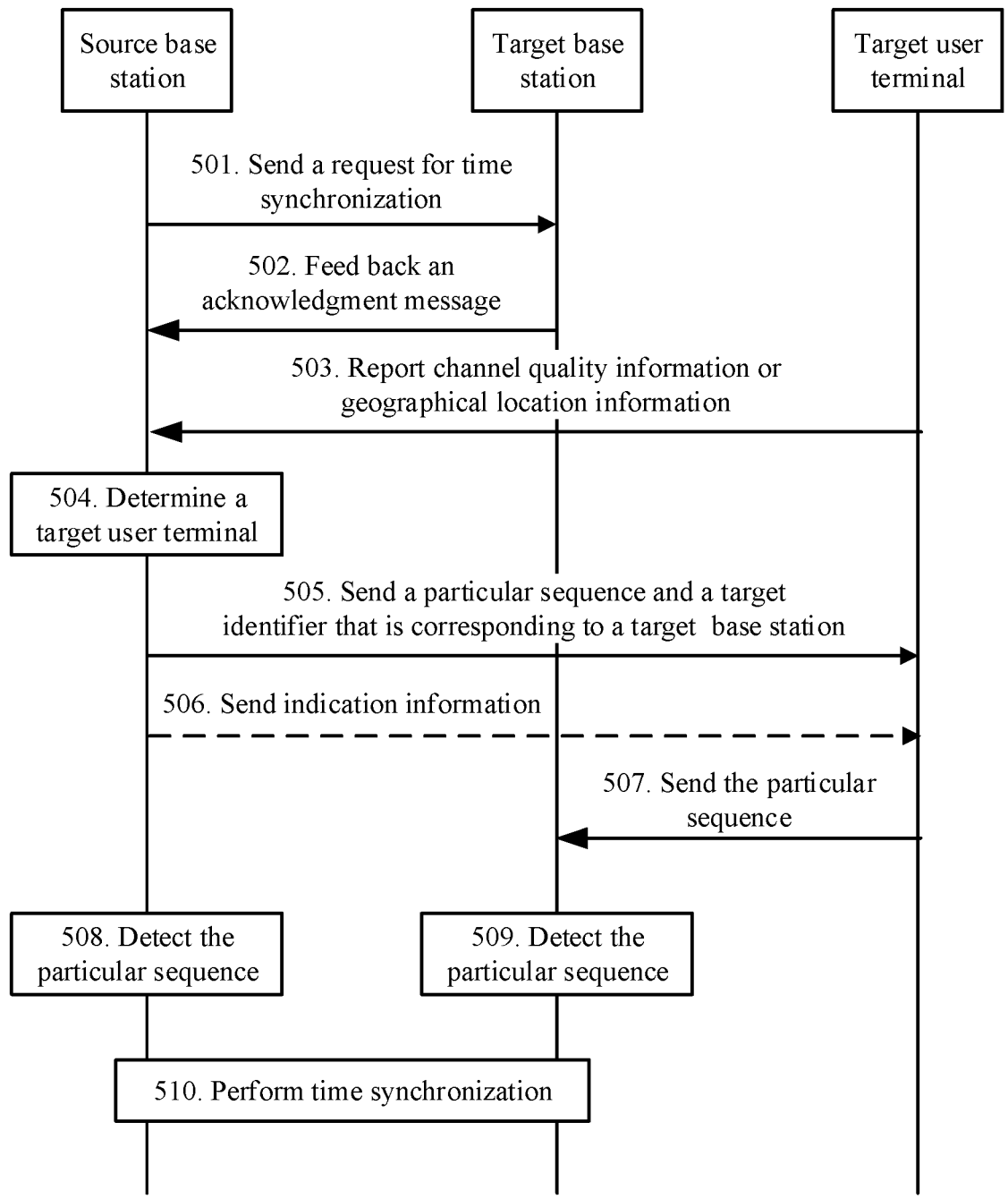
FIG. 5 is a schematic flowchart of another inter-base-station synchronization method according to an embodiment of the present disclosure.

Referring to FIG. 5, FIG. 5 is a schematic flowchart of another inter-base-station synchronization method according to an embodiment of the present disclosure. As shown in FIG. 5, the method according to this embodiment of the present disclosure may include step 501 to step 510.

501. A source base station sends a request for time synchronization to a target base station.

In one embodiment, the source base station sends the request for time synchronization to the target base station. It may be understood that the request for time synchronization is used to instruct the target base station to perform time synchronization.

Correspondingly, the target base station receives the request for time synchronization sent by the source base station.

502. The target base station feeds back an acknowledgment message.

In one embodiment, the target base station feeds back the acknowledgment message, where the acknowledgment message is used to indicate that the target base station determines to perform time synchronization with the source base station, so that the source base station continues to perform time synchronization.

Correspondingly, the source base station receives the acknowledgment message of the target base station.

503. The target user terminal reports channel quality information or geographical location information to the source base station.

In one embodiment, the target user terminal reports the channel quality information or the geographical location information to the source base station. In one embodiment, for a manner of reporting the information by the target user terminal to the source base station, reference may be made to a prior-art reporting manner. For example, the target user terminal reports the information according to a specific time period, or may report the information after receiving a command of the source base station. This is not limited in this embodiment of the present disclosure.

It should be noted that step 503 may be performed before step 501 and step 502, and there is no limitation on a sequential order.

504. The source base station determines the target user terminal located in a particular area.

In one embodiment, the source base station determines the target user terminal located in the particular area. The source base station is corresponding to a coverage area, and the target base station is corresponding to a coverage area. It may be understood that the user terminal in the coverage area can establish a connection to a corresponding base station for communication. The particular area includes an area covered by both the source base station and the target base station, or the particular area includes an area in which a user terminal sending a signal that can be received by the source base station and the target base station is located. The source base station determines a user terminal located in the particular area as a target user terminal. A manner of determining a target user terminal is not limited in this embodiment of the present disclosure. The following describes two feasible solutions.

In one solution, the source base station determines, based on channel quality information reported by at least one user terminal, a user terminal whose channel quality information carries a channel quality value corresponding to the source base station and a channel quality value corresponding to the target base station, as a target user terminal located in the particular area. Because a channel quality value is reported by a user terminal, and a channel quality value of any base station is used to indicate signal strength, measured by the user terminal, of the base station, if channel quality information reported by the user terminal includes channel quality values of the source base station and the target base station, it indicates that the user terminal is located in the particular area. If there is one determined user terminal located in the particular area, the source base station determines the user terminal as a target user terminal. If there are a number of determined user terminals located in the particular area, the source base station may determine, from the user terminals, one user terminal from the user terminals as a target user terminal. For example, a first manner is: The source base station determines a user terminal with a highest channel quality value corresponding to the target base station, as a target user terminal. A second manner is: The source base station determines a user terminal with a channel quality value corresponding to the source base station less than a preset threshold, as a target user terminal. A third manner is: The source base station determines one user terminal in an idle state or in a no-data-sending state from the user terminals, as a target user terminal, where the idle state is used to indicate a state in which an RRC connection is released, and the no-data-sending state is used to indicate a state in which an RRC connection is established and no data is sent to the source base station. In one embodiment, in this embodiment of the present disclosure, for the foregoing three solutions for determining a target user terminal from a number of user terminals located in the particular area, if a target user terminal cannot be determined in one manner, any manner can be used in combination with one or two of the other two manners, to determine a target user terminal.

In another solution, the source base station determines, based on geographical location information reported by at least one user terminal, a user terminal whose geographical location information is located in the particular area, as a target user terminal. If there are a number of determined user terminals located in the particular area, the source base station determines one user terminal in an idle state or in a no-data-sending state from the user terminals as a target user terminal. The idle state and the no-data-sending state are described in the foregoing solution.

It should be noted that step 504 may be performed before step 501 and step 502, and there is no limitation on a sequential order.

505. The source base station sends a particular sequence and a target identifier that is corresponding to the target base station to the target user terminal located in the particular area.

In one embodiment, the source base station sends the particular sequence and the target identifier that is corresponding to the target base station to the target user terminal located in the particular area. In one embodiment, the particular sequence may be a pilot signal or a random access preamble. This is not limited in this embodiment of the present disclosure. The target identifier is sent, so that the target user terminal sends, based on the target identifier, the particular sequence to the target base station corresponding to the target identifier.

In one embodiment, the source base station may choose to send both the target identifier and the particular sequence to the target user terminal.

Correspondingly, the target user terminal receives the particular sequence and the target identifier that is corresponding to the target base station.

506. The source base station sends indication information to the target user terminal.

In one embodiment, the indication information is used to indicate target sending time and/or a target resource for sending the particular sequence by the target user terminal, so that the target user terminal sends the particular sequence according to the indication information.

It should be noted that step 506 may be performed before step 505, or the indication information, the target identifier, and the particular sequence are sent to the target user terminal at the same time, which is not limited in this embodiment of the present disclosure. A sequential order of performing the steps is also not limited.

Correspondingly, the target user terminal receives the indication information.

507. The target user terminal sends the particular sequence to the target base station.

In one embodiment, the target user terminal sends the particular sequence to the target base station based on the indication information. Correspondingly, the target base station may directly receive the particular sequence sent by the target user terminal, and the source base station performs blind detection. When the particular sequence is a random access preamble, the target user terminal sends the random access preamble by initiating random access. When the particular sequence is a pilot signal, the target user terminal sends the pilot signal at any protocol layer in a network system structure. The pilot signal may be an SRS, a DMRS, or other types of signals. This is not limited in this embodiment of the present disclosure. The network system structure may include but is not limited to an OSI 7-layer model and a TCP/IP 5-layer model. During specific implementation, the pilot signal may be sent on a control channel such as a PDCCH or an EPHCCH, or may be sent by using a MAC layer message, or RLC layer or RRC signaling.

It should be noted that the source base station and the target base station need to learn of the to-be-detected or to-be-received particular sequence in advance, no matter whether the target base station directly receives the particular sequence or the source base station performs blind detection on the particular sequence. This helps the source base station and the target base station record time at which the particular sequence is found, to perform time synchronization. In one embodiment, the particular sequence is sent by the source base station to the target base station after being added to the request for time synchronization, for example, the particular sequence is temporarily determined or selected from a number of candidate particular sequences by the source base station. Alternatively, the particular sequence is sent by the target base station to the source base station after being added to the acknowledgment message, for example, the particular sequence is temporarily determined or selected from a number of candidate particular sequences by the target base station. Alternatively, the particular sequence is a sequence agreed by the source base station and the target base station before the request for time synchronization is sent. Alternatively, the particular sequence includes a sequence jointly agreed by a number of base stations in a synchronization area under areas covered by the source base station and the target base station. It may be understood that if there is one agreed sequence, both the source base station and the target base station have known the particular sequence used to indicate time synchronization. In this case, the source base station and the target base station do not need to determine the particular sequence again, and therefore neither of the base stations need to send the particular sequence to the other party.

508. The source base station detects the particular sequence.

In one embodiment, the source base station detects the particular sequence. In one embodiment, the source base station performs step 508 after sending the particular sequence to the target user terminal.

509. The target base station detects the particular sequence.

In one embodiment, the target base station detects the particular sequence. In one embodiment, the target base station performs step 509 after feeding back the acknowledgment message to the source base station.

It should be noted that the particular sequence detected in step 508 and step 509 is sent by the target user terminal. Further, the target user terminal simultaneously sends the particular sequence to the target base station and the source base station for detection. In one embodiment, when sending the particular sequence, the target user terminal may add a times identifier, for example, a first time or a second time. The first time indicates that the target user terminal sends the particular sequence for the first time after receiving the particular sequence sent by the source base station this time. Meanings of other times can be deduced by analogy. In this way, accuracy of detecting the particular sequence by the target base station and the source base station can be increased.

510. The source base station and the target base station perform time synchronization.

Figure 6A:
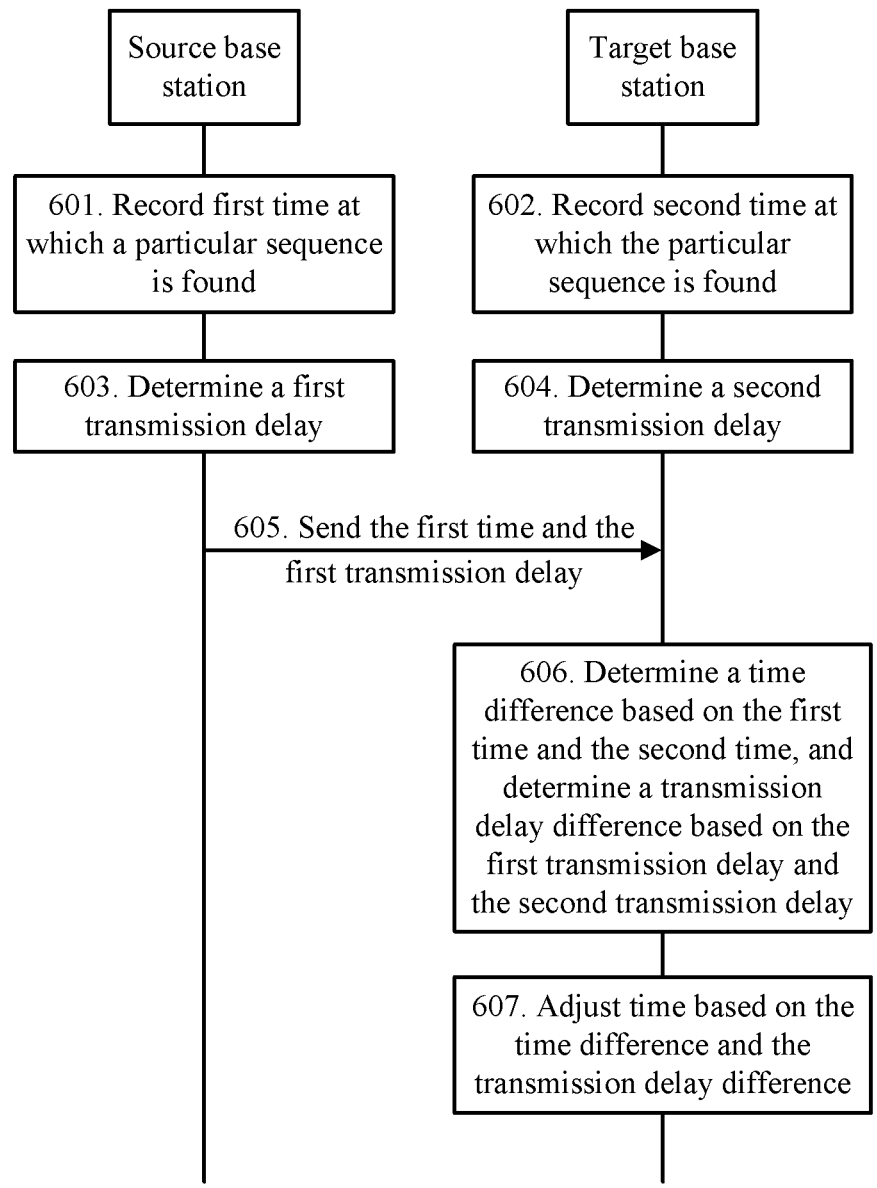
FIG. 6A is a schematic flowchart of another inter-base-station synchronization method according to an embodiment of the present disclosure.
Figure 6B:
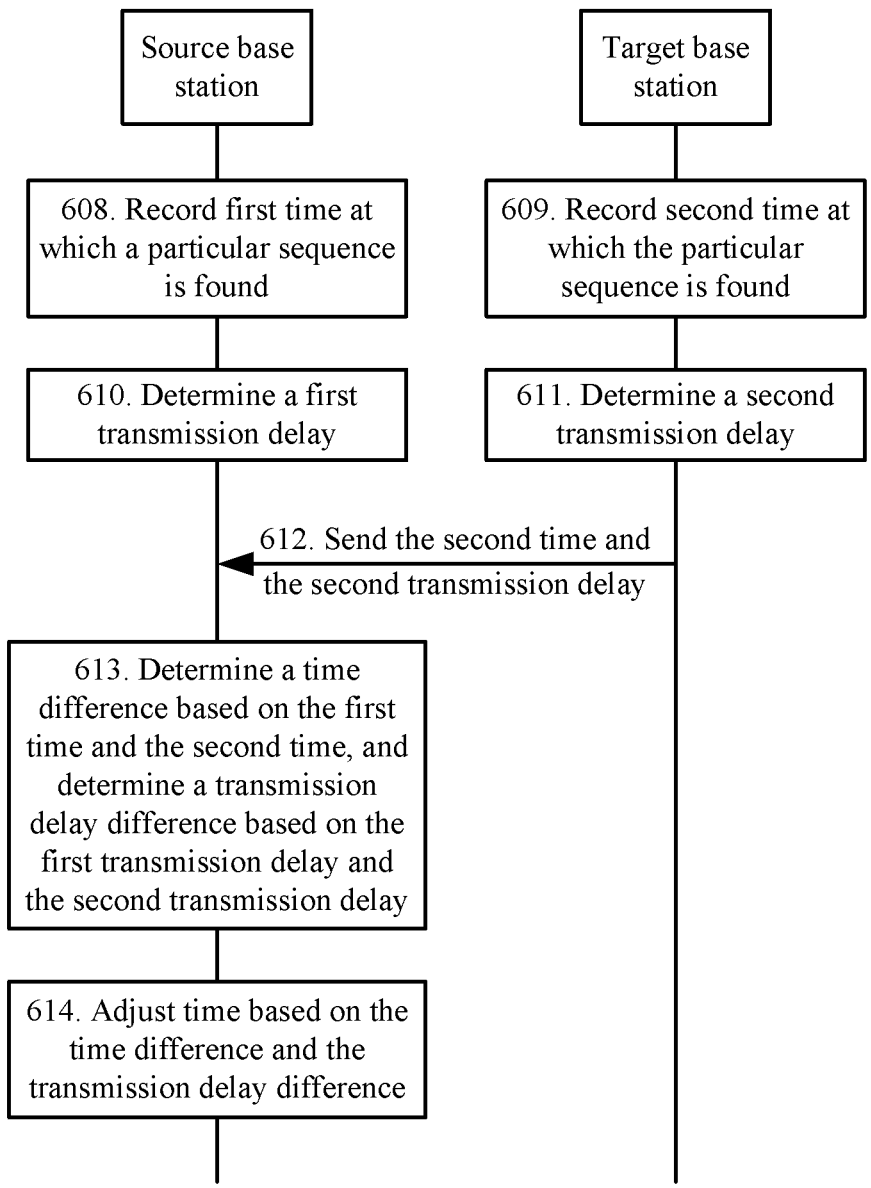
FIG. 6B is a schematic flowchart of another inter-base-station synchronization method according to an embodiment of the present disclosure.

In one embodiment, the source base station and the target base station perform time synchronization. For a specific implementation, reference may be made to FIG. 4A, FIG. 4B, FIG. 6A, and FIG. 6B. For FIG. 4A and FIG. 4B, reference may be made to the specific description in the embodiment corresponding to FIG. 3. Details are not described herein again. FIG. 6A and FIG. 6B are schematic flowcharts for time synchronization performed by the source base station and the target base station.

As shown in FIG. 6A, the schematic flowchart for time synchronization includes step 601 to step 607.

601. The source base station records first time at which the particular sequence is found.

In one embodiment, the source base station performs blind detection, and records time at which the particular sequence sent by the target user terminal is found, as second time at which the particular sequence is found.

602. The target base station records second time at which the particular sequence is found.

In one embodiment, the target base station records time at which the particular sequence sent by the target user terminal is received, as the first time at which the particular sequence is found.

603. The source base station determines a first transmission delay.

In one embodiment, the source base station determines the first transmission delay. In a feasible solution, the source base station determines the first transmission delay between the source base station and the target user terminal based on most recent random access by the target user terminal to the source base station. In another feasible solution, the source base station sends a random access command to the target user terminal, so that the target user terminal initiates random access according to the random access command; and the source base station determines the first transmission delay between the source base station and the target user terminal based on the random access initiated by the target user terminal.

604. The target base station determines a second transmission delay.

In one embodiment, the target base station determines the second transmission delay. In one embodiment, the target base station determines the second transmission delay between the target base station and the target user terminal based on the particular sequence sent by the target user terminal to the target base station.

It should be noted that there is no limitation on a sequential order of step 603 and step 604.

605. The source base station sends the first time and the first transmission delay to the target base station.

In one embodiment, the source base station sends the first time and the first transmission delay to the target base station.

Correspondingly, the target base station receives the first time and the first transmission delay.

606. The source base station determines a time difference based on the first time and the second time, and determines a transmission delay difference based on the first transmission delay and the second transmission delay.

In one embodiment, the target base station determines the time difference based on the first time and the second time. For example, if the first time is T1, and the second time is T2, the time difference is T2−T1. The target base station determines the transmission delay difference based on the first transmission delay and the second transmission delay. For example, if the first time is D1, and the second time is D2, the time difference is D2−D1.

607. The target base station adjusts time of the target base station based on the time difference and the transmission delay difference.

In one embodiment, the target base station adjusts the time of the target base station based on the time difference and the transmission delay difference. In the foregoing example, the target base station may determine to adjust the time forward or backward based on T2−T1+D2−D1. If T2−T1+D2−D1 is less than 0, the target base station adjusts the time forward |T2−T1+D2−D1|; if T2−T1+D2−D1 is greater than 0, the target base station adjusts the time backward |T2−T1+D2−D1|; or if T2−T1+D2−D1 is equal to 0, it indicates that the target base station is time-synchronized with the source base station, and no adjustment is required.

As shown in FIG. 6B, the schematic flowchart for time synchronization includes step 608 to step 614.

608. The source base station records first time at which the particular sequence is found.

In one embodiment, the source base station performs blind detection, and records time at which the particular sequence sent by the target user terminal is found, as second time at which the particular sequence is found.

609. The target base station records second time at which the particular sequence is found.

In one embodiment, the target base station records time at which the particular sequence sent by the target user terminal is received, as the first time at which the particular sequence is found.

610. The source base station determines a first transmission delay.

In one embodiment, the source base station determines the first transmission delay. In one embodiment, the source base station determines the first transmission delay between the source base station and the target user terminal based on most recent random access by the target user terminal to the source base station. In another embodiment, the source base station sends a random access command to the target user terminal, so that the target user terminal initiates random access according to the random access command; and the source base station determines the first transmission delay between the source base station and the target user terminal based on the random access initiated by the target user terminal.

611. The target base station determines a second transmission delay.

In one embodiment, the target base station determines the second transmission delay. In one embodiment, the target base station determines the second transmission delay between the target base station and the target user terminal based on the particular sequence sent by the target user terminal to the target base station.

It should be noted that there is no limitation on a sequential order of step 610 and step 611.

612. The target base station sends the second time and the first transmission delay to the source base station.

In one embodiment, the target base station sends the first time and the first transmission delay to the source base station.

Correspondingly, the source base station receives the first time and the first transmission delay.

613. The source base station determines a time difference based on the first time and the second time, and determines a transmission delay difference based on the first transmission delay and the second transmission delay.

In one embodiment, the source base station determines the time difference based on the first time and the second time. For example, if the first time is T1, and the second time is T2, the time difference is T2−T1. The target base station determines the transmission delay difference based on the first transmission delay and the second transmission delay. For example, if the first time is D1, and the second time is D2, the time difference is D2−D1.

614. The source base station adjusts time of the source base station based on the time difference and the transmission delay difference.

In one embodiment, the source base station adjusts the time of the source base station based on the time difference and the transmission delay difference. In the foregoing example, the source base station may determine to adjust the time forward or backward based on T2−T1+D2−D1. If T2−T1+D2−D1 is less than 0, the source base station adjusts the time forward |T2−T1+D2−D1|; if T2−T1+D2−D1 is greater than 0, the source base station adjusts the time backward |T2−T1+D2−D1|; or if T2−T1+D2−D1 is equal to 0, it indicates that the source base station is time-synchronized with the target base station, and no adjustment is required.

It should be noted that in this embodiment of the present disclosure, the source base station may send the request for time synchronization to the target base station when having a service requirement related to the target base station, so that time synchronization is performed based on the service requirement, thereby reducing an occupied system resource. In addition, regardless of the solutions, actually, there is a user terminal located in the particular area in most cases, and the particular sequence is information frequently sent by the user terminal. Therefore, according to this embodiment of the present disclosure, inter-base-station time synchronization can be implemented conveniently.

Further, the solutions in this embodiment of the present disclosure are also applicable to time synchronization among at least three base stations. For example, in one embodiment, time of any base station or a pre-agreed base station may be used as a reference, and the other base stations are non-reference base station. Time recorded by the reference base station may be sent to the non-reference base stations, and the non-reference base stations perform time synchronization based on time recorded by the non-reference base stations and the time sent by the reference base station.

In this embodiment of the present disclosure, after the source base station and the target base station determine to perform time synchronization, the target user terminal located in the particular area forwards the particular sequence to the target base station, so that both the source base station and the target base station detect the particular sequence and record the related time information, to implement inter-base-station time synchronization. Because it is simple and convenient to determine a target user terminal, an inter-base-station synchronization period can be shortened, thereby increasing synchronization precision.

Figure 7:
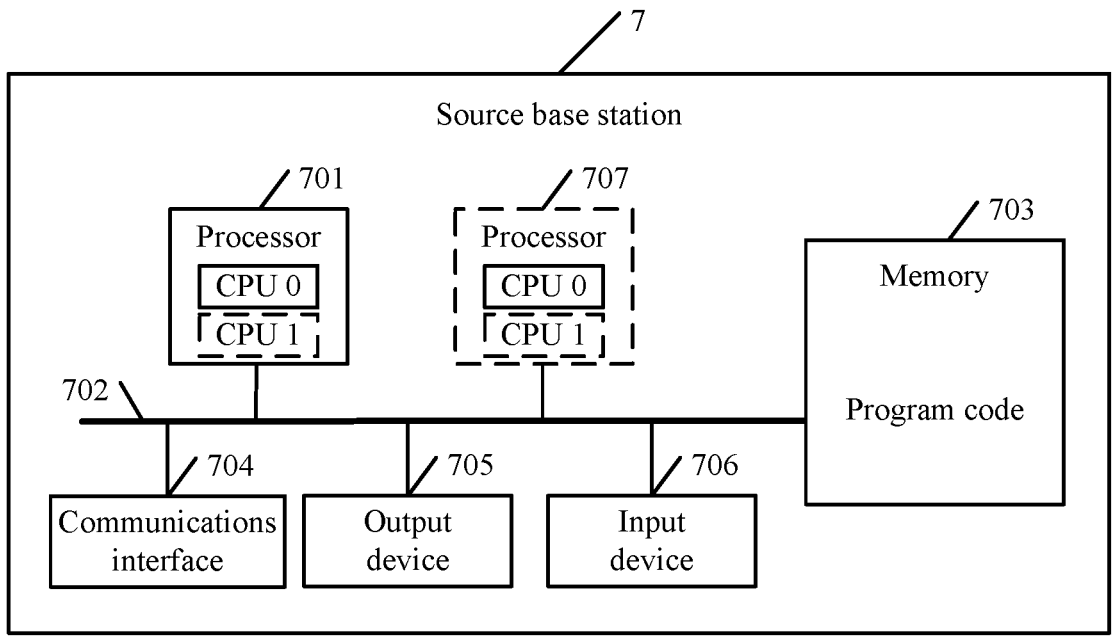
FIG. 7 is a schematic structural diagram of a source base station according to an embodiment of the present disclosure.

Referring to FIG. 7, FIG. 7 is a schematic structural diagram of a source base station according to an embodiment of the present disclosure. As shown in FIG. 7, a source base station 7 includes at least one processor 701, a communications bus 702, a memory 703, and at least one communications interface 704.

The processor 701 may be a general-purpose central processing unit (CPU), a microprocessor, an application-specific integrated circuit (ASIC), or one or more integrated circuits configured to control program execution in the solutions of the present disclosure.

The communications bus 702 may include a channel and transmits information between the foregoing components. The communications interface 704 uses any transceiver like apparatus to communicate with another device or a communications network, such as an Ethernet, a radio access network (RAN), or a wireless local area network (WLAN).

The memory 703 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or optical disc storage (including a compact disc, a laser disc, an optical disc, a digital versatile disc, a Blu-ray disc, or the like), a magnetic disk storage medium or another magnetic storage device, or any other medium that can be used to carry or store expected program code in an instruction or data structure form and that can be accessed by a computer, but is not limited thereto. The memory may exist independently, and is connected to the processor by using the bus. Alternatively, the memory may be integrated with the processor.

The memory 703 is configured to store application program code for performing the solutions of the present disclosure, and the processor 701 controls the execution. The processor 701 is configured to execute the application program code stored in the memory 703.

In one embodiment, the processor 701 may include one or more CPUs, for example, a CPU 0 and a CPU 1 in FIG. 7.

In one embodiment, the source base station 7 may include a number of processors, for example, the processor 701 and a processor 707 in FIG. 7. Each of the processors may be a single-core (single-CPU) processor, or may be a multi-core (multi-CPU) processor. The processors herein may be one or more devices, circuits, and/or processing cores for processing data (for example, a computer program instruction).

In one embodiment, the source base station 7 may further include an output device 705 and an input device 706. The output device 705 communicates with the processor 701, and may display information in a number of manners. For example, the output device 705 may be a liquid crystal display (LCD), a light emitting diode (LED) display device, a cathode ray tube (CRT) display device, a projector, or the like. The input device 706 communicates with the processor 701, and may receive a user input in a number of manners. For example, the input device 706 may be a mouse, a keyboard, a touchscreen device, a sensor device, or the like.

The source base station 7 may be a general-purpose computer device or a dedicated computer device. A type of the source base station 7 is not limited in this embodiment of the present disclosure.

In one embodiment, the processor 701 may perform the following steps by executing the program code stored in the memory 703:

sending, for the source base station, a request for time synchronization to a target base station, so that the target base station feeds back an acknowledgment message for the request for time synchronization;

receiving, for the source base station, the acknowledgment message fed back by the target base station;

sending, for the source base station, a particular sequence to a target user terminal located in a particular area, so that the target user terminal sends the particular sequence; and detecting, for the source base station, the particular sequence, and performing time synchronization between the source base station and the target base station.

In one embodiment, before sending the particular sequence to the target user terminal located in the particular area, the processor 701 further performs the following step: determining, by the processor 701 based on channel quality information reported by at least one user terminal, a user terminal whose channel quality information carries a channel quality value corresponding to the source base station and a channel quality value corresponding to the target base station, as a target user terminal located in the particular area, where the particular area includes an area covered by both the source base station and the target base station, or the particular area includes an area in which a user terminal sending a signal that can be received by the source base station and the target base station is located.

In one embodiment, the processor 701 further performs the following step: if there are a number of determined user terminals located in the particular area, determining a user terminal with a channel quality value corresponding to the source base station less than a preset threshold and/or with a highest channel quality value corresponding to the target base station, as a target user terminal located in the particular area.

In one embodiment, before sending the particular sequence to the target user terminal located in the particular area, the processor 701 further performs the following step: determining, based on geographical location information reported by at least one user terminal, a user terminal whose geographical location information is located in the particular area, as a target user terminal.

In one embodiment, the processor 701 further performs the following step: if there are a number of determined user terminals located in the particular area, determining one user terminal in an idle state or in a no-data-sending state from the user terminals as a target user terminal, where the idle state is used to indicate a state in which an RRC connection is released, and the no-data-sending state is used to indicate a state in which an RRC connection is established and no data is sent to the source base station.

In one embodiment, the particular sequence is sent by the source base station to the target base station after being added to the request for time synchronization; or the particular sequence is sent by the target base station to the source base station after being added to the acknowledgment message; or the particular sequence is a sequence agreed by the source base station and the target base station before the request for time synchronization is sent; or the particular sequence includes a sequence jointly agreed by a number of base stations in a synchronization area under areas covered by the source base station and the target base station.

In one embodiment, the particular sequence includes a random access preamble or a pilot signal, where the random access preamble is sent by the target user terminal through random access, and the pilot signal is sent by the target user terminal at any protocol layer in a network system structure.

In one embodiment, the processor 701 further performs the following step: sending indication information to the target user terminal, where the indication information is used to indicate target sending time and/or a target resource for sending the particular sequence by the target user terminal, so that the target user terminal sends the particular sequence according to the indication information.

In one embodiment, when detecting the particular sequence and performing time synchronization between the source base station and the target base station, the processor 701 performs the following steps: detecting the particular sequence, and recording first time at which the particular sequence is found; and sending the first time to the target base station, so that the target base station performs time synchronization based on the first time and the second time.

In one embodiment, after sending the first time to the target base station, the processor 701 further performs the following step: sending a first transmission delay to the target base station, so that the target base station performs time synchronization based on the first time, the second time, the first transmission delay, and a second transmission delay, where the first transmission delay is a transmission delay between the target user terminal and the source base station, and the second transmission delay is a transmission delay between the target user terminal and the target base station.

In one embodiment, when detecting the particular sequence and performing time synchronization between the source base station and the target base station, the processor 701 performs the following steps: detecting the particular sequence, and recording first time at which the particular sequence is found; receiving second time sent by the target base station; determining a time difference between the first time and the second time; and adjusting time of the source base station based on the time difference, to complete time synchronization between the source base station and the target base station.

In one embodiment, before adjusting the time of the source base station based on the time difference, to complete time synchronization between the source base station and the target base station, the processor 701 further performs the following steps: receiving a second transmission delay sent by the target base station, where the second transmission delay is a transmission delay between the target user terminal and the target base station; and determining a transmission delay difference between a first transmission delay and the second transmission delay, where the first transmission delay is a transmission delay between the target user terminal and the source base station.

When adjusting the time of the source base station based on the time difference, to complete time synchronization between the source base station and the target base station, the processor 701 performs the following step: adjusting the time of the source base station based on the time difference and the transmission delay difference, to complete time synchronization between the source base station and the target base station.

In one embodiment, the detected particular sequence found by the source base station is sent by the target user terminal to the source base station, so that the target base station performs blind detection and records the second time at which the particular sequence is found.

In one embodiment, the processor 701 further performs the following step: sending a target base station identity corresponding to the target base station to the target user terminal, so that the target user terminal sends the particular sequence to the target base station, and the target base station records the second time at which the particular sequence is found, where the source base station determines, through blind detection, the first time at which the particular sequence is found.

In one embodiment, the processor 701 further performs the following step: determining the first transmission delay between the source base station and the target user terminal based on most recent ransom access by the target user terminal to the source base station.

In one embodiment, the processor 701 further performs the following steps: sending a random access command to the target user terminal, so that the target user terminal initiates random access according to the random access command; and determining the first transmission delay between the source base station and the target user terminal based on the random access initiated by the target user terminal.

In this embodiment of the present disclosure, after determining, with the target base station, to perform time synchronization, the source base station sends the particular sequence to the user terminal located in the particular area, and the user terminal forwards the sequence, so that the to-be-synchronized base stations detect the particular sequence, to implement inter-base-station time synchronization. This reduces implementation difficulty and shortens an inter-base-station synchronization period, thereby increasing synchronization precision.

Figure 8:
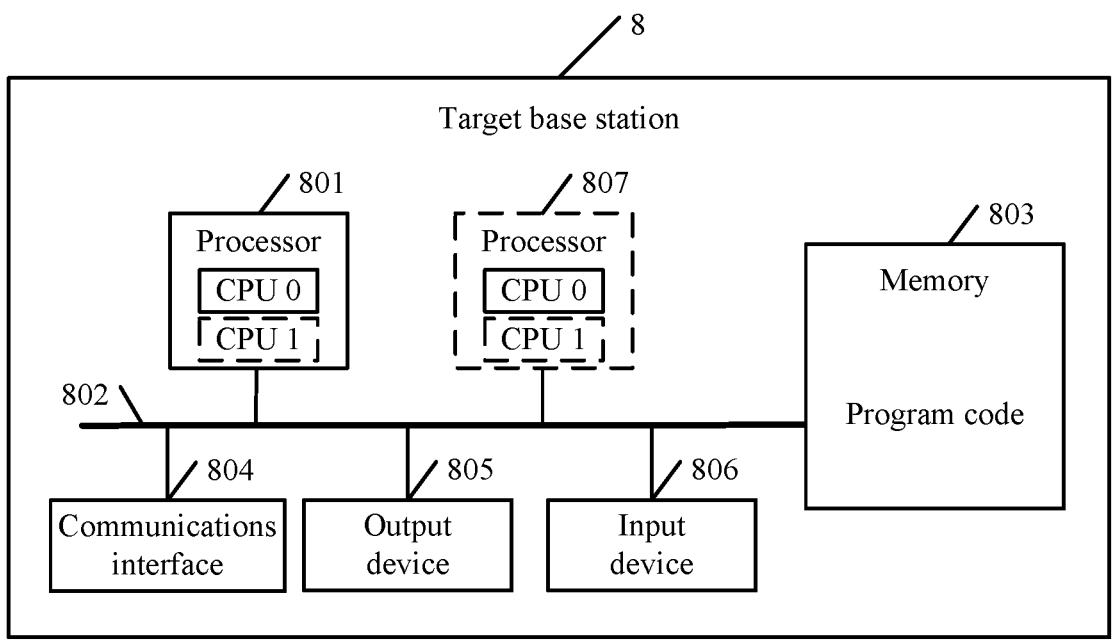
FIG. 8 is a schematic structural diagram of a target base station according to an embodiment of the present disclosure.

Referring to FIG. 8, FIG. 8 is a schematic structural diagram of a target base station according to an embodiment of the present disclosure. As shown in FIG. 8, the target base station 8 includes at least one processor 801, a communications bus 802, a memory 803, and at least one communications interface 804.

The processor 801 may be a general-purpose central processing unit (CPU), a microprocessor, an application-specific integrated circuit (ASIC), or one or more integrated circuits configured to control program execution in the solutions of the present disclosure.

The communications bus 802 may include a channel and transmits information between the foregoing components. The communications interface 804 uses any transceiver like apparatus to communicate with another device or a communications network, such as an Ethernet, a radio access network (RAN), or a wireless local area network (WLAN).

The memory 803 may be a read-only memory (ROM) or another type of static storage device that can store static information and instructions, or a random access memory (RAM) or another type of dynamic storage device that can store information and instructions, or may be an electrically erasable programmable read-only memory (EEEPROM), a compact disc read-only memory (CD-ROM) or other optical disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in an instruction or data structure form and that can be accessed by a computer, but is not limited thereto. The memory may exist independently, and is connected to the processor by using the bus. Alternatively, the memory may be integrated with the processor.

The memory 803 is configured to store application program code for performing the solutions of the present disclosure, and the processor 801 controls the execution. The processor 801 is configured to execute the application program code stored in the memory 803.

During specific implementation, in an embodiment, the processor 801 may include one or more CPUs, for example, a CPU 0 and a CPU 1 in FIG. 8.

In one embodiment, the target base station 8 may include a number of processors, for example, the processor 801 and a processor 807 in FIG. 8. Each of the processors may be a single-core (single-CPU) processor, or may be a multi-core (multi-CPU) processor. The processors herein may be one or more devices, circuits, and/or processing cores for processing data (for example, a computer program instruction).

In one embodiment, the target base station 8 may further include an output device 805 and an input device 806. The output device 805 communicates with the processor 801, and may display information in a number of manners. For example, the output device 805 may be a liquid crystal display (CD), a light emitting diode (LED) display device, a cathode ray tube (CRT) display device, a projector, or the like. The input device 806 communicates with the processor 801, and may receive a user input in a number of manners. For example, the input device 806 may be a mouse, a keyboard, a touchscreen device, a sensor device, or the like.

The target base station 8 may be a general-purpose computer device or a dedicated computer device. A type of the target base station 8 is not limited in this embodiment of the present disclosure.

In one embodiment, the processor 801 may perform the following steps by executing the program code stored in the memory 803:

receiving, for the target base station, a request for time synchronization sent by a source base station;

feeding back, for the target base station, an acknowledgment message for the request for time synchronization to the source base station, so that after receiving the acknowledgment message, the source base station sends a particular sequence to a target user terminal located in a particular area; and detecting, for the target base station, the particular sequence, and performing time synchronization between the source base station and the target base station.

In one embodiment, during an execution process of the processor 801, the particular sequence is sent by the source base station to the target base station after being added to the request for time synchronization; or the particular sequence is sent by the target base station to the source base station after being added to the acknowledgment message; or the particular sequence is a sequence agreed by the source base station and the target base station before the request for time synchronization is received; or the particular sequence includes a sequence jointly agreed by a number of base stations in a synchronization area under areas covered by the source base station and the target base station.

In one embodiment, the particular sequence includes a random access preamble or a pilot signal, where the random access preamble is sent by the target user terminal through random access, and the pilot signal is sent by the target user terminal at any protocol layer in a network system structure.

In one embodiment, when detecting the particular sequence and performing time synchronization between the source base station and the target base station, the processor 801 performs the following steps: detecting the particular sequence, and recording second time at which the particular sequence is found; receiving first time sent by the source base station; determining a time difference between the first time and the second time; and adjusting time of the target base station based on the time difference, to complete time synchronization between the source base station and the target base station.

In one embodiment, before adjusting the time of the target base station based on the time difference, to complete time synchronization between the source base station and the target base station, the processor 801 further performs the following steps: receiving a first transmission delay sent by the source base station, where the first transmission delay is a transmission delay between the target user terminal and the source base station; and determining a transmission delay difference between the first transmission delay and a second transmission delay, where the second transmission delay is a transmission delay between the target user terminal and the target base station; and when adjusting the time of the target base station based on the time difference, to complete time synchronization between the source base station and the target base station, the processor 801 performs the following step: adjusting the time of the target base station based on the time difference and the transmission delay difference, to complete time synchronization between the source base station and the target base station.

In one embodiment, when detecting the particular sequence and performing time synchronization between the source base station and the target base station, the processor 801 performs the following steps: detecting the particular sequence, and recording second time at which the particular sequence is found; and sending the second time to the source base station, so that the source base station performs time synchronization based on the first time and the second time.

In one embodiment, after sending the second time to the source base station, the processor 801 further performs the following step: sending a first transmission delay to the source base station, so that the source base station performs time synchronization based on the first time, the second time, the first transmission delay, and a second transmission delay, where the first transmission delay is a transmission delay between the target user terminal and the source base station, and the second transmission delay is a transmission delay between the target user terminal and the target base station.

In one embodiment, the processor 801 further performs the following step:

determining the second transmission delay between the target base station and the target user terminal based on the particular sequence sent by the target user terminal to the target base station.

In one embodiment, during an execution process of the processor 801, the particular sequence found by the target base station is sent by the target user terminal to the source base station, so that the target base station performs blind detection and records the second time at which the particular sequence is found.

In one embodiment, during an execution process of the processor 801, the particular sequence found by the target base station is sent by the target user terminal to the target base station, so that the source base station performs blind detection and records the first time at which the particular sequence is found.

In this embodiment of the present disclosure, after determining, with the target base station, to perform time synchronization, the source base station sends the particular sequence to the user terminal located in the particular area, and the user terminal forwards the sequence, so that the to-be-synchronized base stations detect the particular sequence, to implement inter-base-station time synchronization. This reduces implementation difficulty and shortens an inter-base-station synchronization period, thereby increasing synchronization precision.

Figure 9:
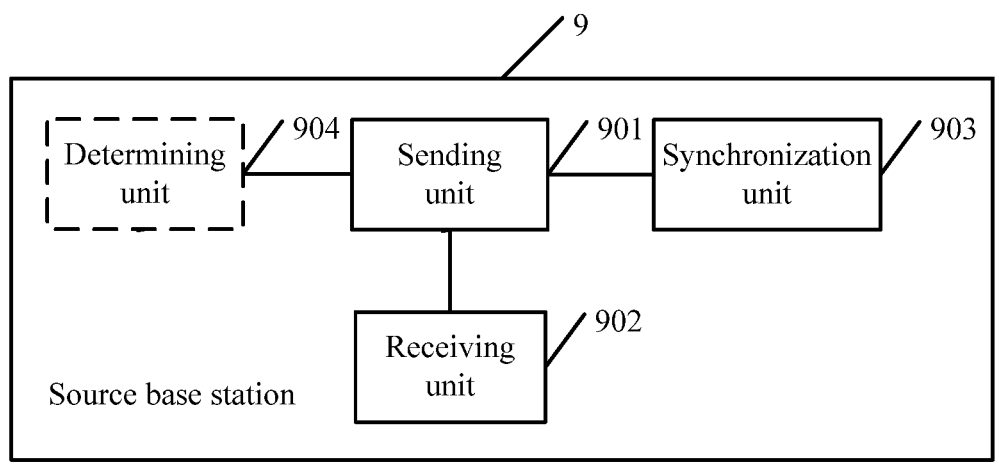
FIG. 9 is a schematic structural diagram of another source base station according to an embodiment of the present disclosure.

Referring to FIG. 9, FIG. 9 is a schematic structural diagram of another source base station according to an embodiment of the present disclosure. The source base station according to this embodiment of the present disclosure may be the source base station provided in any embodiment in FIG. 2 to FIG. 6. As shown in FIG. 9, the source base station 9 according to this embodiment of the present disclosure may include a sending unit 901, a receiving unit 902, and a synchronization unit 903. In one embodiment, the source base station 9 further includes a determining unit 904.

The sending unit 901 is configured to send a request for time synchronization to a target base station, so that the target base station feeds back an acknowledgment message for the request for time synchronization;

the receiving unit 902 is configured to receive the acknowledgment message fed back by the target base station; where the sending unit 901 is further configured to send a particular sequence to a target user terminal located in a particular area, so that the target user terminal sends the particular sequence; and the synchronization unit 903 is configured to: detect the particular sequence, and perform time synchronization between the source base station and the target base station.

In one embodiment, the source base station further includes: a determining unit 904, configured to determine, based on channel quality information reported by at least one user terminal, a user terminal whose channel quality information carries a channel quality value corresponding to the source base station and a channel quality value corresponding to the target base station, as a target user terminal located in the particular area, where the particular area includes an area covered by both the source base station and the target base station, or the particular area includes an area in which a user terminal sending a signal that can be received by the source base station and the target base station is located.

In one embodiment, the determining unit 904 is further configured to: if there are a number of determined user terminals located in the particular area, determine a user terminal with a channel quality value corresponding to the source base station less than a preset threshold and/or with a highest channel quality value corresponding to the target base station, as a target user terminal located in the particular area.

In one embodiment, the determining unit 904 is further configured to: determine based on geographical location information reported by at least one user terminal, a user terminal whose geographical location information is located in the particular area, as a target user terminal.

In one embodiment, the determining unit 904 is further configured to: if there are a number of determined user terminals located in the particular area, determine one user terminal in an idle state or in a no-data-sending state from the user terminals as a target user terminal, where the idle state is used to indicate a state in which an RRC connection is released, and the no-data-sending state is used to indicate a state in which an RRC connection is established and no data is sent to the source base station.

In one embodiment, the particular sequence is sent by the source base station to the target base station after being added to the request for time synchronization; or the particular sequence is sent by the target base station to the source base station after being added to the acknowledgment message; or the particular sequence is a sequence agreed by the source base station and the target base station before the request for time synchronization is sent; or the particular sequence includes a sequence jointly agreed by a number of base stations in a synchronization area under areas covered by the source base station and the target base station.

In one embodiment, the particular sequence includes a random access preamble or a pilot signal, where the random access preamble is sent by the target user terminal through random access, and the pilot signal is sent by the target user terminal at any protocol layer in a network system structure.

In one embodiment, the sending unit 901 is further configured to send indication information to the target user terminal, where the indication information is used to indicate target sending time and/or a target resource for sending the particular sequence by the target user terminal, so that the target user terminal sends the particular sequence according to the indication information.

In one embodiment, the synchronization unit 903 includes:

a first time determining unit configured to: detect the particular sequence, and record first time at which the particular sequence is found; and a time sending unit configured to send the first time to the target base station, so that the target base station performs time synchronization based on the first time and second time, where the second time indicates time at which the target base station finds the particular sequence.

In one embodiment, the synchronization unit 903 further includes:

a delay sending unit, configured to send a first transmission delay to the target base station, so that the target base station performs time synchronization based on the first time, the second time, the first transmission delay, and a second transmission delay, where the first transmission delay is a transmission delay between the target user terminal and the source base station, and the second transmission delay is a transmission delay between the target user terminal and the target base station.

In one embodiment, the synchronization unit 903 includes:

a second time determining unit configured to: detect the particular sequence, and record first time at which the particular sequence is found;

a time receiving unit configured to receive second time sent by the target base station, where the second time indicates time at which the target base station finds the particular sequence;

a time difference determining unit configured to determine a time difference between the first time and the second time; and a time adjustment unit configured to adjust time of the source base station based on the time difference, to complete time synchronization between the source base station and the target base station.

In one embodiment, the synchronization unit 903 further includes:

a delay receiving unit configured to receive a second transmission delay sent by the target base station, where the second transmission delay is a transmission delay between the target user terminal and the target base station; and a delay difference determining unit configured to determine a transmission delay difference between a first transmission delay and the second transmission delay, where the first transmission delay is a transmission delay between the target user terminal and the source base station; and the time adjustment unit is configured to adjust the time of the source base station based on the time difference and the transmission delay difference, to complete time synchronization between the source base station and the target base station.

In one embodiment, the particular sequence found by the source base station is sent by the target user terminal to the source base station, so that the target base station performs blind detection and records the second time at which the particular sequence is found.

In one embodiment, the sending unit 901 is further configured to send a target base station identity corresponding to the target base station to the target user terminal, so that the target user terminal sends the particular sequence to the target base station, and the target base station records the second time at which the particular sequence is found, where the source base station determines, through blind detection, the first time at which the particular sequence is found.

In one embodiment, the synchronization unit 903 further includes:

a first delay determining unit configured to determine the first transmission delay between the source base station and the target user terminal based on most recent random access by the target user terminal to the source base station.

In one embodiment, the synchronization unit 903 further includes:

a command sending unit configured to send a random access command to the target user terminal, so that the target user terminal initiates random access according to the random access command; and a second delay determining unit configured to determine the first transmission delay between the source base station and the target user terminal based on the random access initiated by the target user terminal.

It should be noted that functions of the functional units of the source base station 9 described in this embodiment of the present disclosure may be implemented according to the methods in the method embodiments shown in FIG. 2 to FIG. 6. Details are not described herein again.

An embodiment of the present disclosure further provides a computer storage medium configured to store a computer software instruction used by the foregoing source base station shown in FIG. 9, where the computer software instruction includes a program that is designed for the source base station to perform the foregoing aspects. The target user terminal can send the particular sequence after execution of the stored program, so that both the source base station and the target base station can record the related time information, to implement inter-base-station time synchronization.

Figure 10:
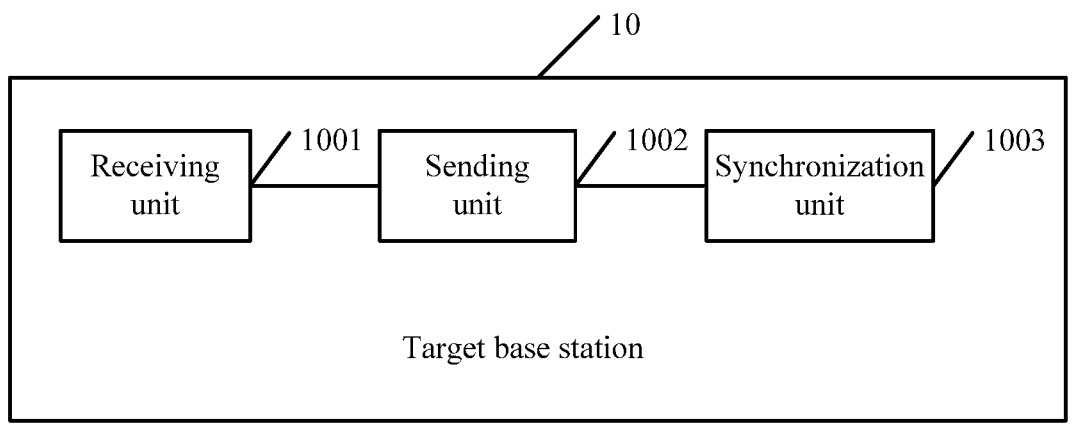
FIG. 10 is a schematic structural diagram of another target base station according to an embodiment of the present disclosure.

Referring to FIG. 10, FIG. 10 is a schematic structural diagram of another target base station according to an embodiment of the present disclosure. The target base station according to this embodiment of the present disclosure may be the target base station provided in any embodiment in FIG. 2 to FIG. 6. As shown in FIG. 10, the target base station 10 according to this embodiment of the present disclosure may include a receiving unit 1001, a sending unit 1002, and a synchronization unit 1003.

The receiving unit 1001 is configured to receive a request for time synchronization sent by a source base station;

the sending unit 1002 is configured to feed back an acknowledgment message for the request for time synchronization to the source base station, so that after receiving the acknowledgment message, the source base station sends a particular sequence to a target user terminal located in a particular area; and the synchronization unit 1003 is configured to: detect the particular sequence, and perform time synchronization between the source base station and the target base station.

In one embodiment, the particular sequence is sent by the source base station to the target base station after being added to the request for time synchronization; or the particular sequence is sent by the target base station to the source base station after being added to the acknowledgment message; or the particular sequence is a sequence agreed by the source base station and the target base station before the request for time synchronization is received; or the particular sequence includes a sequence jointly agreed by a number of base stations in a synchronization area under areas covered by the source base station and the target base station.

In one embodiment, the particular sequence includes a random access preamble or a pilot signal, where the random access preamble is sent by the target user terminal through random access, and the pilot signal is sent by the target user terminal at any protocol layer in a network system structure.

In one embodiment, the synchronization unit 1003 includes:

a first time determining unit configured to: detect the particular sequence, and record second time at which the particular sequence is found;

a time receiving unit configured to receive first time sent by the source base station, where the first time indicates time at which the source base station finds the particular sequence;

a time difference determining unit configured to determine a time difference between the first time and the second time; and a time adjustment unit configured to adjust time of the target base station based on the time difference, to complete time synchronization between the source base station and the target base station.

In one embodiment, the synchronization unit 1003 further includes:

a delay receiving unit configured to receive a first transmission delay sent by the source base station, where the first transmission delay is a transmission delay between the target user terminal and the source base station; and a delay difference determining unit configured to determine a transmission delay difference between the first transmission delay and a second transmission delay, where the second transmission delay is a transmission delay between the target user terminal and the target base station; and the time adjustment unit is configured to adjust the time of the target base station based on the time difference and the transmission delay difference, to complete time synchronization between the source base station and the target base station.

In one embodiment, the synchronization unit 1003 includes:

a second time determining unit, configured to: detect the particular sequence, and record second time at which the particular sequence is found; and a time sending unit, configured to send the second time to the source base station, so that the source base station performs time synchronization based on the first time and the second time, where the first time indicates time at which the source base station finds the particular sequence.

In one embodiment, the synchronization unit 1003 further includes:

a delay sending unit, configured to send a first transmission delay to the source base station, so that the source base station performs time synchronization based on the first time, the second time, the first transmission delay, and a second transmission delay, where the first transmission delay is a transmission delay between the target user terminal and the source base station, and the second transmission delay is a transmission delay between the target user terminal and the target base station.

In one embodiment, the synchronization unit 1003 further includes:

a delay determining unit, configured to determine the second transmission delay between the target base station and the target user terminal based on the particular sequence sent by the target user terminal to the target base station through random access.

In one embodiment, the particular sequence found by the target base station is sent by the target user terminal to the source base station, so that the target base station performs blind detection and records the second time at which the particular sequence is found.

In one embodiment, the particular sequence found by the target base station is sent by the target user terminal to the target base station, so that the source base station performs blind detection and records the first time at which the particular sequence is found.

It should be noted that functions of the functional units of the target base station 10 described in this embodiment of the present disclosure may be implemented according to the methods in the method embodiments shown in FIG. 2 to FIG. 6. Details are not described herein again.

An embodiment of the present disclosure further provides another computer storage medium, configured to store a computer software instruction used by the foregoing target base station shown in FIG. 10, where the computer software instruction includes a program that is designed for the target base station to perform the foregoing aspects. The target user terminal can send the particular sequence after execution of the stored program, so that both the source base station and the target base station can record the related time information, to implement inter-base-station time synchronization.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also appreciate that all the embodiments described in this specification are embodiments, and the related actions and modules are not necessarily mandatory to the present disclosure.

In the foregoing embodiments, the descriptions of various embodiments have respective focuses. For a part that is not described in detail in an embodiment, reference may be made to related descriptions in other embodiments.

A sequence of the steps of the methods in the embodiments of the present disclosure may be adjusted, or steps may be combined or removed depending on an actual requirement.

The units of the apparatuses in the embodiments of the present disclosure may be combined, divided, and deleted depending on an actual requirement. A person skilled in the art may integrate or combine different embodiments or characteristics of different embodiments described in this specification.

With descriptions of the foregoing implementations, a person skilled in the art may clearly understand that the present disclosure may be implemented by hardware, firmware, or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium that can be accessed by a computer. The following is used as an example but is not construed as limitation: The computer-readable medium may include a random access memory (RAM), a read-only memory (ROM), an electrically erasable programmable read-only memory (EEPROM), a compact disc read-only memory (CD-ROM) or other optical disc storage, a magnetic disk storage medium or another magnetic storage device, or any other medium that can be used to carry or store expected program code in an instruction or data structure form and that can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL), or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure includes a compact disc (CD), a laser disc, an optical disc, a digital versatile disc (DVD), a floppy disk, and a Blu-ray disc, where the disk generally copies data magnetically, and the disc copies data optically by using a laser. The foregoing combination should also be included in the protection scope of the computer-readable medium.

In summary, what is described above is merely examples of embodiments of the technical solutions in the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A method of inter-base-station synchronization, comprising:
  sending, by a source base station, a request for time synchronization to a target base station request for time synchronization;
  receiving, by the source base station, an acknowledgment message from the target base station;
  sending, by a sending unit of the source base station, a particular sequence to a target user terminal located in a particular area; and
  detecting, by a synchronization unit of the source base station, the particular sequence sent to the target user terminal, and performing time synchronization between the source base station and the target base station,
  wherein detecting, by the source base station, the particular sequence, and performing time synchronization between the source base station and the target base station comprise:
  detecting, by the source base station, the particular sequence, and recording a first time at which the particular sequence is found, and
  sending, by the source base station, the first time to the target base station.

2. The method according to claim 1, further comprising:
  determining, by the source base station based on channel quality information reported by at least one user terminal, a user terminal having channel quality information that carries a channel quality value corresponding to the source base station and a channel quality value corresponding to the target base station, as the target user terminal located in the particular area, wherein
  the particular area comprises an area covered by both the source base station and the target base station, or an area in which a user terminal sending a signal received by the source base station and the target base station.

3. The method according to claim 2, further comprising:
  if there are a plurality of determined user terminals located in the particular area, determining, by the source base station, a user terminal with a channel quality value corresponding to the source base station less than a preset threshold or with a highest channel quality value corresponding to the target base station, as the target user terminal located in the particular area.

4. The method according to claim 2, further comprising:
  if there are a plurality of determined user terminals located in the particular area, determining, by the source base station, one user terminal in an idle state or in a no-data-sending state from the determined user terminals as the target user terminal, wherein
  the idle state is used to indicate a state in which a radio resource control (RRC) connection is released, and the no-data-sending state is used to indicate a state in which the RRC connection is established and no data is sent to the source base station.

5. The method according to claim 1, further comprising:
  determining, by the source base station based on geographical location information reported by at least one user terminal, a user terminal having geographical location information of the particular area as the target user terminal.

6. The method according to claim 1, wherein
  the particular sequence is sent by the source base station to the target base station after being added to the request for time synchronization; or
  the particular sequence is sent by the target base station to the source base station after being added to the acknowledgment message; or
  the particular sequence is a sequence agreed by the source base station and the target base station before the request for time synchronization is sent; or
  the particular sequence comprises a sequence jointly agreed by a plurality of base stations in a synchronization area under areas covered by the source base station and the target base station.

7. The method according to claim 1, further comprising:
  sending, by the source base station, a first transmission delay to the target base station, so that the target base station performs time synchronization based on the first time, a second time, the first transmission delay, and a second transmission delay, wherein
  the first transmission delay is a transmission delay between the target user terminal and the source base station, and the second transmission delay is a transmission delay between the target user terminal and the target base station.

8. The method according to claim 1, wherein the detecting, by the source base station, the particular sequence, and performing time synchronization between the source base station and the target base station comprises:
  detecting, by the source base station, the particular sequence, and recording a first time at which the particular sequence is found;
  receiving, by the source base station, a second time sent by the target base station, wherein the second time indicates a time at which the target base station finds the particular sequence;
  determining, by the source base station, a time difference between the first time and the second time; and
  adjusting, by the source base station, a time of the source base station based on the time difference to complete time synchronization between the source base station and the target base station.

9. The method according to claim 8, further comprising:
receiving, by the source base station, a second transmission delay sent by the target base station, wherein the second transmission delay is a transmission delay between the target user terminal and the target base station; and
determining, by the source base station, a transmission delay difference between a first transmission delay and the second transmission delay, wherein the first transmission delay is a transmission delay between the target user terminal and the source base station; and
wherein adjusting, by the source base station, the time of the source base station based on the time difference to complete time synchronization between the source base station and the target base station comprises:
adjusting, by the source base station, the time of the source base station based on the time difference and the transmission delay difference to complete time synchronization between the source base station and the target base station.

10. A base station, comprising: a processor, a communications bus, a memory, and a communications interface, wherein
the memory is configured to store instructions, and the processor is configured to invoke the instructions stored in the memory, to enforce the base station to perform operations, comprising:
sending a request for time synchronization to a target base station;
receiving an acknowledgment message from the target base station;
sending, using a sending unit of the base station, a particular sequence to a target user terminal located in a particular area;
detecting, using a synchronization unit of the base station, the particular sequence sent to the target user terminal; and
performing time synchronization between the base station and the target base station,
wherein detecting the particular sequence, and performing time synchronization between the base station and the target base station comprise:
detecting the particular sequence, and recording a first time at which the particular sequence is found; and
sending the first time to the target base station.

11. The base station according to claim 10, wherein the operations further comprise:
determining, based on channel quality information reported by at least one user terminal, a user terminal having channel quality information that carries a channel quality value corresponding to the base station and a channel quality value corresponding to the target base station, as the target user terminal located in the particular area, wherein
the particular area comprises an area covered by both the base station and the target base station, or an area in which a user terminal sending a signal received by the base station and the target base station.

12. The base station according to claim 11, wherein the operations further comprise:
if there are a plurality of determined user terminals located in the particular area, determining a user terminal with a channel quality value corresponding to the base station less than a preset threshold or the base station with a highest channel quality value corresponding to the target base station, as the target user terminal located in the particular area.

13. The base station according to claim 11, wherein the operations further comprise:
if there are a plurality of determined user terminals located in the particular area, determining one user terminal in an idle state or in a no-data-sending state from the determined user terminals as the target user terminal, wherein
the idle state is used to indicate a state in which a radio resource control (RRC) connection is released, and the no-data-sending state is used to indicate a state in which the RRC connection is established and no data is sent to the base station.

14. The base station according to claim 10, wherein the operations further comprise:
determining, based on geographical location information reported by at least one user terminal, a user terminal having geographical location information of the particular area as the target user terminal.

15. The base station according to claim 10, wherein the particular sequence is sent by the base station to the target base station after being added to the request for time synchronization; or
the particular sequence is sent by the target base station to the base station after being added to the acknowledgment message; or
the particular sequence is a sequence agreed by the base station and the target base station before the request for time synchronization is sent; or
the particular sequence comprises a sequence jointly agreed by a plurality of base stations in a synchronization area comprising areas covered by the base station and the target base station.

16. The base station according to claim 10, wherein the operations further comprise:
sending a first transmission delay to the target base station, so that the target base station performs time synchronization based on the first time, a second time, the first transmission delay, and a second transmission delay, wherein
the first transmission delay is a transmission delay between the target user terminal and the base station, and the second transmission delay is a transmission delay between the target user terminal and the target base station.

17. The base station according to claim 10, wherein detecting the particular sequence, and performing time synchronization between the base station and the target base station comprise:
detecting the particular sequence, and recording a first time at which the particular sequence is found;
receiving a second time sent by the target base station, wherein the second time indicates a time at which the target base station finds the particular sequence;
determining a time difference between the first time and the second time; and
adjusting a time of the base station based on the time difference to complete time synchronization between the base station and the target base station.

18. The base station according to claim 17, wherein the operations further comprise:
receiving a second transmission delay sent by the target base station, wherein the second transmission delay is a transmission delay between the target user terminal and the target base station; and
determining a transmission delay difference between a first transmission delay and the second transmission delay, wherein the first transmission delay is a transmission delay between the target user terminal and the base station; and wherein adjusting the time of the base station based on the time difference to complete time synchronization between the base station and the target base station comprises:

adjusting the time of the base station based on the time difference and the transmission delay difference to complete time synchronization between the base station and the target base station.

\* \* \* \* \*